United States Patent
Yokoi et al.

(10) Patent No.: US 8,922,839 B2
(45) Date of Patent: Dec. 30, 2014

(54) INFORMATION PROCESSING APPARATUS AND INFORMATION PROCESSING METHOD

(75) Inventors: Masanori Yokoi, Yokohama (JP); Koji Harada, Fuchu (JP); Junichi Hayashi, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 213 days.

(21) Appl. No.: 13/567,416

(22) Filed: Aug. 6, 2012

(65) Prior Publication Data

US 2013/0057880 A1 Mar. 7, 2013

(30) Foreign Application Priority Data

Sep. 7, 2011 (JP) ................................. 2011-195346

(51) Int. Cl.
| | | |
|---|---|---|
| *H04N 1/40* | (2006.01) | |
| *H04N 1/60* | (2006.01) | |
| *H04N 1/00* | (2006.01) | |
| *H04N 1/32* | (2006.01) | |

(52) U.S. Cl.
CPC .............. *H04N 1/60* (2013.01); *H04N 1/32149* (2013.01); *H04N 1/0087* (2013.01)
USPC ........... 358/3.28; 358/1.9; 358/518; 358/520; 358/521; 382/100

(58) Field of Classification Search
USPC ......................................... 358/3.28; 382/100
See application file for complete search history.

(56) References Cited

U.S. PATENT DOCUMENTS

| | | | |
|---|---|---|---|
| 6,354,502 B1 * | 3/2002 | Hagstrom et al. ....... | 235/462.04 |
| 6,535,616 B1 | 3/2003 | Hayashi et al. | |
| 6,741,758 B2 | 5/2004 | Hayashi et al. | |
| 6,826,290 B1 | 11/2004 | Murakami et al. | |
| 6,873,711 B1 | 3/2005 | Murakami et al. | |
| 6,993,148 B1 | 1/2006 | Miyashita et al. | |
| 7,006,257 B1 | 2/2006 | Yamazaki et al. | |
| 7,006,660 B2 | 2/2006 | Hayashi | |
| 7,142,689 B2 | 11/2006 | Hayashi et al. | |
| 7,146,502 B2 | 12/2006 | Hayashi | |
| 7,167,988 B2 | 1/2007 | Hayashi | |
| 7,187,781 B2 | 3/2007 | Hayashi | |
| 7,272,239 B2 | 9/2007 | Hayashi | |
| 7,287,284 B2 | 10/2007 | Hayashi | |
| 7,298,528 B2 * | 11/2007 | Nagashima .................. | 358/3.28 |
| 7,307,761 B2 * | 12/2007 | Man ............................. | 358/3.28 |

(Continued)

FOREIGN PATENT DOCUMENTS

JP 3544536 B 7/2004

*Primary Examiner* — Richard Zhu
(74) *Attorney, Agent, or Firm* — Fitzpatrick, Cella, Harper & Scinto

(57) ABSTRACT

A array including array elements in a number smaller than the minimum number of pixels, having values larger than $Th\_c$, and a plurality of array elements having values smaller than $Th\_c$ is generated. A formation array having the same size as that of a latent image is generated from the generated array. An image obtained by replacing the pixel value at a pixel position within the first region in the latent image with the value at the pixel position in the formation array is generated as a configuration image. The pixel value at each pixel position in the configuration image, that corresponds to each pixel position in the input image, is output as the amount of a highly infrared absorbent color material used to print a pixel at this pixel position in the input image.

12 Claims, 15 Drawing Sheets

| COLOR MATERIAL HAVING HIGH INFRARED ABSORBANCE | THRESHOLD $Th\_c$ |
|---|---|
| COLOR MATERIAL 1 | $Th\_c1$ |
| COLOR MATERIAL 2 | $Th\_c2$ |
| ⋮ | ⋮ |

(56) References Cited

U.S. PATENT DOCUMENTS

| | | | |
|---|---|---|---|
| 7,356,148 B2 | 4/2008 | Hayashi | |
| 7,356,149 B2 | 4/2008 | Hayashi | |
| 7,362,860 B2 | 4/2008 | Hayashi | |
| 7,436,551 B2 | 10/2008 | Yamazaki et al. | |
| 7,447,314 B2 | 11/2008 | Hayashi | |
| 7,536,026 B2 | 5/2009 | Kaneda et al. | |
| 7,548,633 B2 | 6/2009 | Hayashi | |
| 7,609,396 B2 | 10/2009 | Harada | |
| 7,609,989 B2 | 10/2009 | Harada | |
| 7,639,835 B2 | 12/2009 | Hayashi | |
| 7,706,530 B2 | 4/2010 | Suga et al. | |
| 7,883,168 B2 * | 2/2011 | Yamamoto | 347/15 |
| 7,922,209 B1 * | 4/2011 | Beretta | 283/91 |
| 7,930,276 B2 | 4/2011 | Hayashi | |
| 7,970,139 B2 | 6/2011 | Hayashi | |
| 8,050,447 B2 | 11/2011 | Hayashi | |
| 8,059,859 B2 | 11/2011 | Harada et al. | |
| 8,064,636 B2 | 11/2011 | Yokoi et al. | |
| 8,250,661 B2 | 8/2012 | Hayashi | |
| 8,323,863 B2 * | 12/2012 | Watanabe et al. | 430/107.1 |
| 8,455,087 B2 * | 6/2013 | Eschbach et al. | 428/195.1 |
| 8,643,910 B2 * | 2/2014 | Ichikawa | 358/443 |
| 2008/0261687 A1 * | 10/2008 | Gatzios | 463/29 |
| 2008/0302263 A1 * | 12/2008 | Eschbach et al. | 101/491 |
| 2008/0304696 A1 * | 12/2008 | Eschbach et al. | 382/100 |
| 2009/0237684 A1 * | 9/2009 | Watanabe | 358/1.9 |
| 2010/0142003 A1 * | 6/2010 | Braun et al. | 358/3.28 |
| 2012/0218608 A1 * | 8/2012 | Maltz et al. | 358/3.28 |

* cited by examiner

FIG. 3A
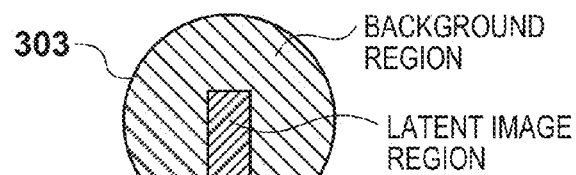
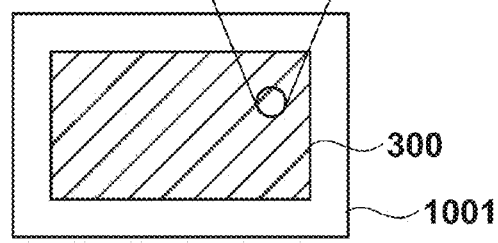
FIG. 3B
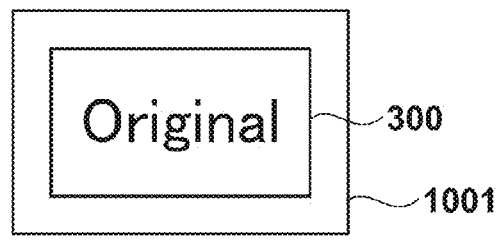
FIG. 3C
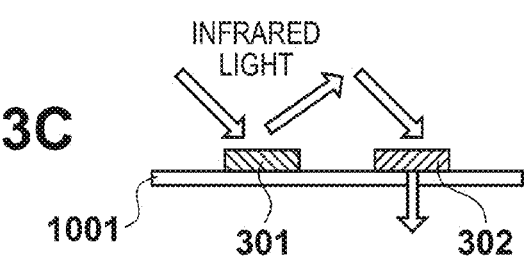
FIG. 3D
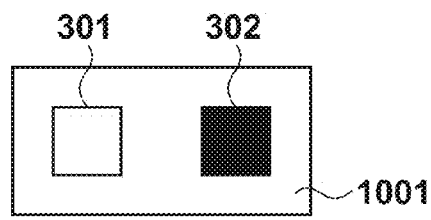

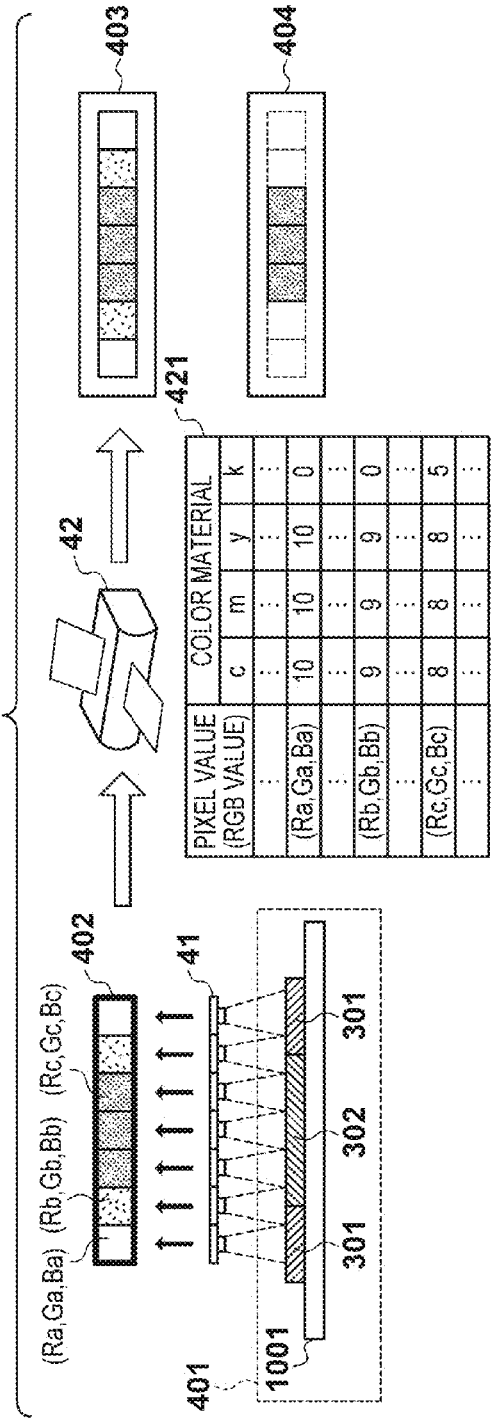
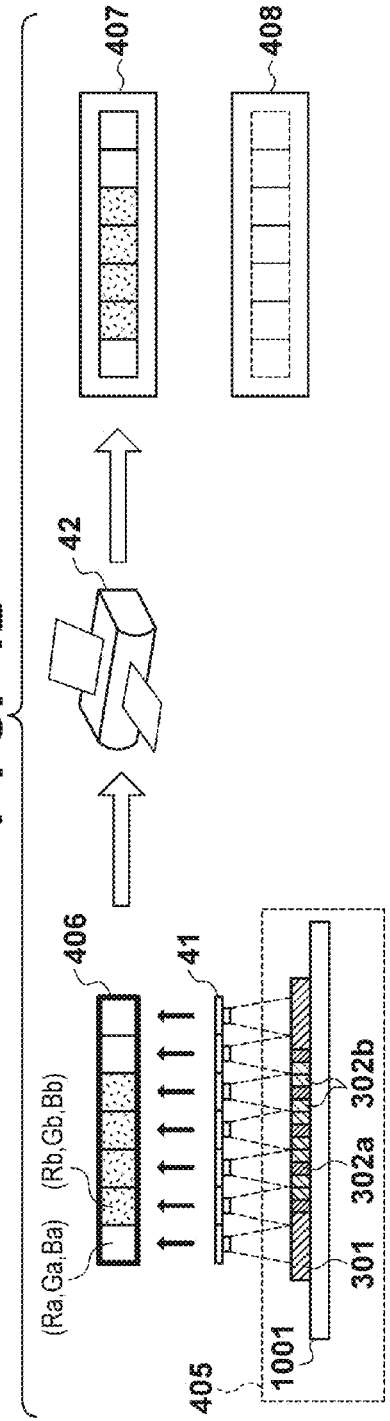
FIG. 4A
FIG. 4B

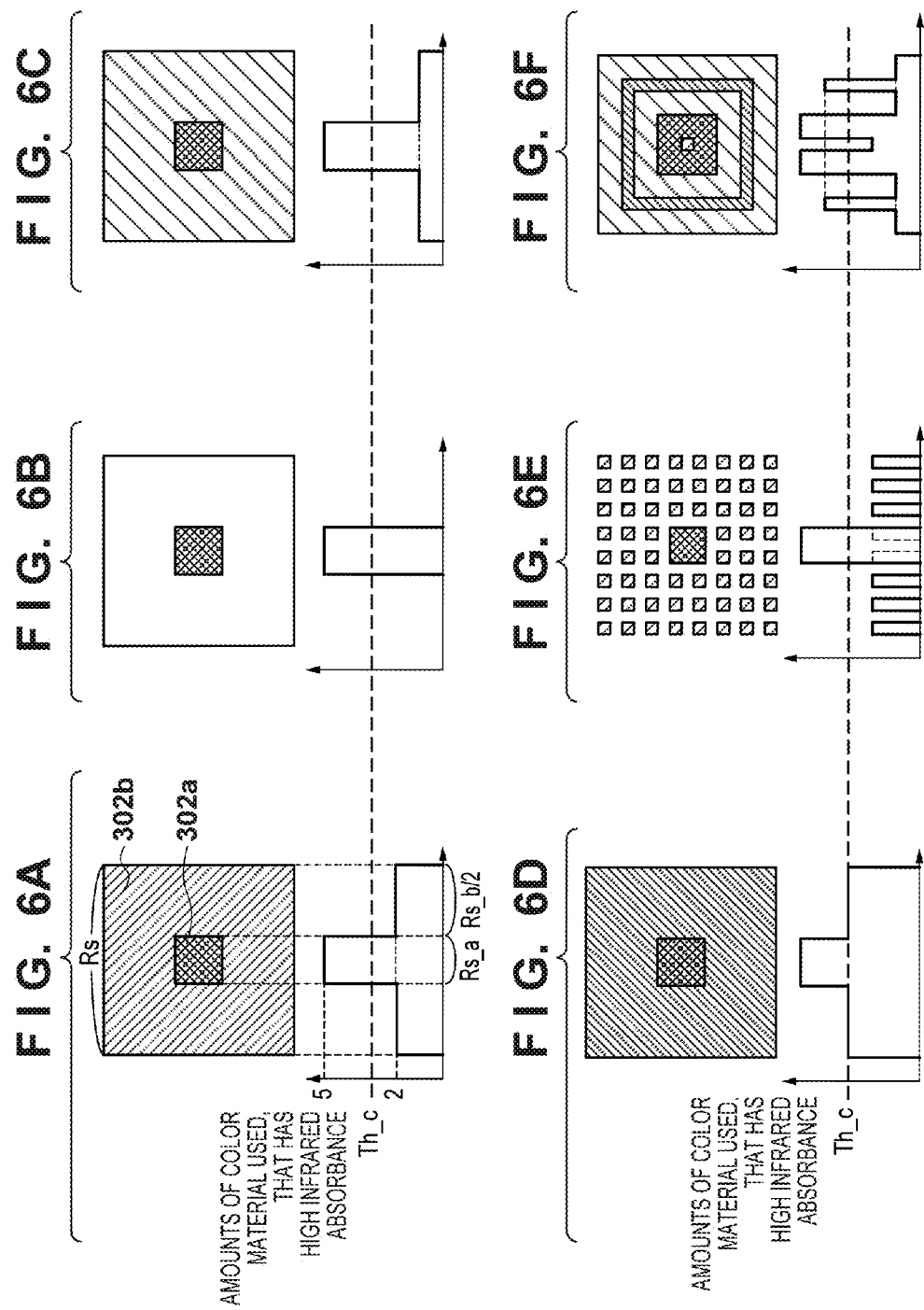

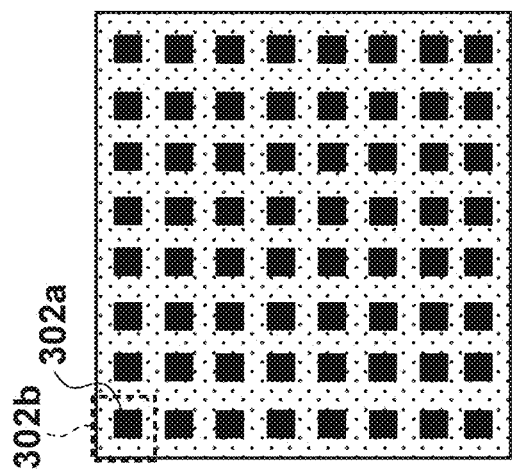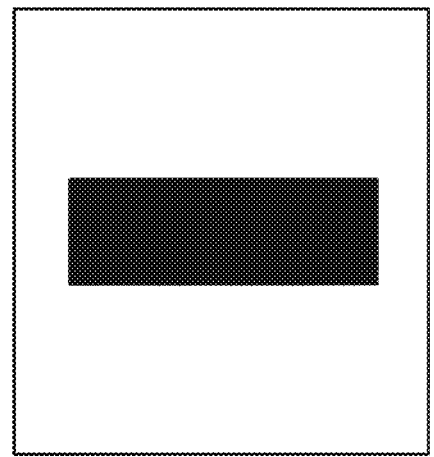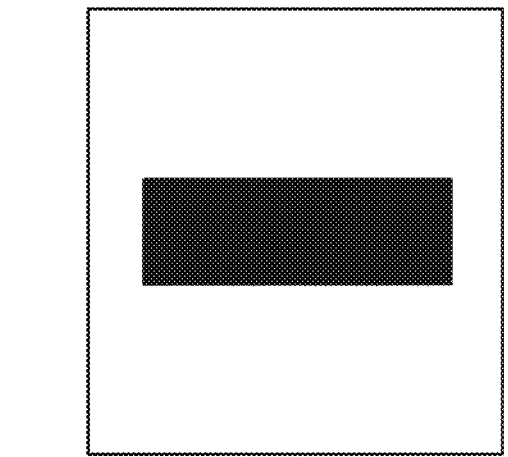

FIG. 8

| PIXEL VALUE (RGB VALUE) | COLOR INFORMATION Ci | | | | | | | | | | | |
|---|---|---|---|---|---|---|---|---|---|---|---|---|
| | FIRST COLOR C1 (Ict=0) | | | | SECOND COLOR C2 (Ict=2) | | | | THIRD COLOR C3 (Ict=5) | | | |
| | c | m | y | k | c | m | y | k | c | m | y | k |
| ... | ... | ... | ... | ... | ... | ... | ... | ... | ... | ... | ... | ... |
| (R1,G1,B1) | 10 | 10 | 10 | 0 | 8 | 9 | 8 | 2 | 7 | 8 | 7 | 5 |
| ... | ... | ... | ... | ... | ... | ... | ... | ... | ... | ... | ... | ... |
| (R2,G2,B2) | 20 | 5 | 20 | 0 | 18 | 3 | 19 | 2 | 17 | 2 | 18 | 5 |
| ... | ... | ... | ... | ... | ... | ... | ... | ... | ... | ... | ... | ... |

(R1,G1,B1) (R2,G2,B2)

F I G. 13

| COLOR MATERIAL HAVING HIGH INFRARED ABSORBANCE | THRESHOLD Th_c |
|---|---|
| COLOR MATERIAL 1 | Th_c1 |
| COLOR MATERIAL 2 | Th_c2 |
| ⋮ | ⋮ |

INFORMATION PROCESSING APPARATUS AND INFORMATION PROCESSING METHOD

BACKGROUND OF THE INVENTION

1. Field of the Invention

The present invention relates to a technique of generating a print image, that includes an image pattern or a character string to be visualized, on a printing medium under infrared light.

2. Description of the Related Art

As an anticounterfeit or authentication technique for a printed product, a printing method that uses an apparatus having a given sensitivity to the infrared range, such as an infrared camera, to allow an image which cannot be visually observed (or can be hardly visually observed) under ordinary light to be easily recognized under infrared light is available.

A typical example of the above-mentioned printing method is a method of printing an image using a color material of black (k), that is employed in general printing operations, because of its high infrared absorbance (Japanese Patent No. 3544536). An image is printed on a printing medium using black (k) having a high infrared absorbance in a latent image region, and using cyan (c), magenta (m), and yellow (y) having low infrared absorbances in a background region. The output printed product is irradiated with infrared light to identify the image using an infrared camera. This allows authentication, in which a printed product having an image that can be identified under infrared light is determined to be authentic, and a printed product having an image that cannot be identified under infrared light is determined to be counterfeit.

In generating a copy, that is, a counterfeit product of a printed product output using the above-mentioned method, it is a common practice to use a scanner and a printer. A copy generated using a scanner and a printer generally has an image that cannot be visually observed under ordinary light but can be identified by observation through an infrared camera upon irradiation with infrared light, despite its degradation in quality, compared to the original image of an authentic product. This means that a copy which has the same effect as an authentic product can be generated.

SUMMARY OF THE INVENTION

The present invention has been made in consideration of the above-mentioned problem, and provides a technique of generating a print image which can be easily identified under infrared light, and is hard to copy.

According to the first aspect of the present invention, an information processing apparatus comprising: a unit that holds a minimum number of pixels which can be copied by an equipment that copies information on a printing medium; a unit that acquires a latent image formed by a first region and a second region when one of a latent image region and a background region is defined as the first region, and the other is defined as the second region; a unit that acquires an input image; a generation unit that generates, upon defining, as a highly infrared absorbent color material, a color material having a highest infrared absorbance among a plurality of color materials of different colors used in a printing apparatus, a two-dimensional array that has a specific size and includes array elements in a number smaller than the minimum number of pixels, which have values larger than a threshold determined in advance as an upper limit of an amount of the highly infrared absorbent color material used per unit area, and a plurality of array elements having values smaller than the threshold, thereby generating, as a two-dimensional formation array, a two-dimensional array having a size identical to a size of the latent image from the generated two-dimensional array; a unit that generates, as a configuration image, an image obtained by replacing a pixel value of a pixel at a pixel position belonging to the first region in the latent image with a value at the pixel position in the two-dimensional formation array; and an output unit that outputs, to the printing apparatus, amounts of the plurality of color materials of the different colors used to print a pixel at each pixel position in the input image, wherein the output unit outputs a pixel value at each pixel position in the configuration image, that corresponds to each pixel position in the input image, as an amount of the highly infrared absorbent color material used to print a pixel at the each pixel position in the input image.

According to the second aspect of the present invention, an information processing method executed by an information processing apparatus that holds a minimum number of pixels which can be copied by an equipment that copies information on a printing medium, the method comprising: a step of acquiring a latent image formed by a first region and a second region when one of a latent image region and a background region is defined as the first region, and the other is defined as the second region; a step of acquiring an input image; a generation step of generating, upon defining, as a highly infrared absorbent color material, a color material having a highest infrared absorbance among a plurality of color materials of different colors used in a printing apparatus, a two-dimensional array that has a specific size and includes array elements in a number smaller than the minimum number of pixels, which have values larger than a threshold determined in advance as an upper limit of an amount of the highly infrared absorbent color material used per unit area, and a plurality of array elements having values smaller than the threshold, thereby generating, as a two-dimensional formation array, a two-dimensional array having a size identical to a size of the latent image from the generated two-dimensional array; a step of generating, as a configuration image, an image obtained by replacing a pixel value of a pixel at a pixel position belonging to the first region in the latent image with a value at the pixel position in the two-dimensional formation array; and an output step of outputting, to the printing apparatus, amounts of the plurality of color materials of the different colors used to print a pixel at each pixel position in the input image, wherein in the output step, a pixel value at each pixel position in the configuration image, that corresponds to each pixel position in the input image, is output as an amount of the highly infrared absorbent color material used to print a pixel at the each pixel position in the input image.

According to the third aspect of the present invention, an information processing apparatus comprising: a color information holding unit that holds color information indicating an amount of each of a plurality of color materials used, which have different infrared absorbances and color differences of those are not more than a preset threshold under visible light; an acquisition unit that acquires latent image data indicating a non-latent image region and a latent image region; and a print image data generation unit that generates print image data from image data, the latent image data, and the color information, wherein the print image data is formed by the non-latent image region and the latent image region, and a size of a first latent image region in the latent image region, in which an amount of a color material having a high infrared absorbance used is not less than a threshold, is smaller than a size which can be copied by an equipment that copies information on a printing medium.

According to the forth aspect of the present invention, an information processing method comprising: a color information holding step of holding color information indicating an amount of each of a plurality of color materials used, which have different infrared absorbances, and color differences of those are not more than a preset threshold under visible light; an acquisition step of acquiring latent image data indicating a non-latent image region and a latent image region; and a print image data generation step of generating print image data from image data, the latent image data, and the color information, wherein the print image data is formed by the non-latent image region and the latent image region, and a size of a first latent image region in the latent image region, in which an amount of a color material having a high infrared absorbance used is not less than a threshold, is smaller than a size which can be copied by an equipment that copies information on a printing medium.

Further features of the present invention will become apparent from the following description of exemplary embodiments with reference to the attached drawings.

BRIEF DESCRIPTION OF THE DRAWINGS

FIGS. 3A to 3D are views for explaining the basic concept of the first embodiment;

FIGS. 4A and 4B are views showing a process of generating a copy;

FIGS. 6A to 6F are views showing pixel blocks;

FIGS. 7A to 7C are views illustrating examples of formation information If, a latent image, and configuration information;

FIG. 8 is a table illustrating an example of the configuration of table information;

FIG. 13 is a table illustrating an example of the configuration of table information.

DESCRIPTION OF THE EMBODIMENTS

Figure 1A:
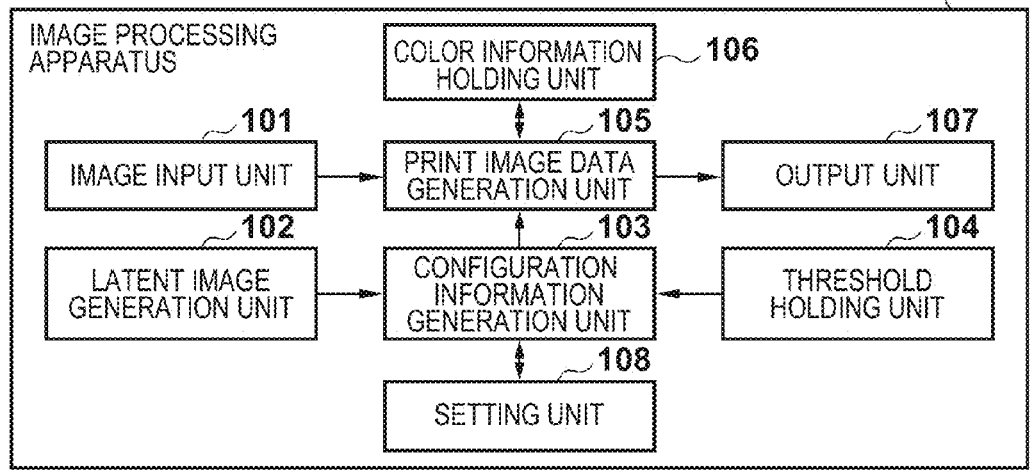
FIGS. 1A to 1C are block diagrams each illustrating an example of the functional configuration of an image processing apparatus.

Embodiments of the present invention will be described below with reference to the accompanying drawings. Note that the embodiments to be described hereinafter are merely examples in which the present invention is actually practiced, and provide one of practical examples of configurations defined in the scope of claims.

[First Embodiment]
<Basic Concept>

The basic concept of this embodiment will be briefly described first with reference to FIGS. 3A to 3D. Referring to FIG. 3C, a second region 301 formed on a printing medium 1001 is printed using a color material having low infrared absorption characteristics (infrared absorbance), and a first region 302 formed on the printing medium 1001 is printed using a color material having a high infrared absorbance. When the printing medium 1001 is irradiated with infrared light, the second region 301 reflects the infrared light because of its low infrared absorbance, and the first region 302 absorbs the infrared light because of its high infrared absorbance. Therefore, when the printing medium 1001 is observed using an infrared camera while the printing medium 1001 is irradiated with infrared light, the second region 301 is observed at high lightness, and the first region 302 is observed at low lightness, as shown in FIG. 3D.

Assume herein that an identification image 300 including a region (latent image region), such as a character string, an image pattern, or a mark, defined as the first region 302, and a region (background region), other than the first region 302, defined as the second region 301 is formed on the printing medium 1001. At this time, even if the printing medium 1001 is observed under ordinary light, the latent image region cannot be visually observed (or can be hardly visually observed) within a region 303 in which the background region and the latent image region are mixed, as shown in FIG. 3A. However, if the printing medium 1001 is observed using a special identification apparatus such as an infrared camera under infrared light, a character string "Original" (first region 302) becomes visible on the identification image 300, as shown in FIG. 3B. The ordinary light means herein D50, that is, colorimetry light having a relative spectral distribution stipulated by, for example, the CIE (International Commission on Illumination).

Such a technique allows authentication, in which, for example, if a specific latent image is identified on the printing medium 1001 upon irradiation of the printing medium 1001 with infrared light, the printing medium 1001 is determined to be authentic; otherwise, the printing medium 1001 is determined to be counterfeit.

Of color materials of the four primary colors: cyan (c), magenta (m), yellow (y), and black (k) used in general printing operations, the color material of black (k) is a black color material containing carbon black as its main component, and has a high infrared absorbance (high infrared absorption characteristics). In contrast to this, the color materials of cyan (c), magenta (m), and yellow (y) are known to have low infrared absorbances (low infrared absorption characteristics).

Hence, when the first region 302 is printed using black (k), and the second region 301 is printed using cyan (c), magenta (m), and yellow (y), the second region 301 is observed at high lightness, and the first region 302 is observed at low lightness.

To identify the latent image region and the background region under infrared light in the identification image 300, the background region or the latent image region eventually need only contain a color material having a high infrared absorbance. In other words, two regions having different infrared absorbances need only be formed intentionally. Therefore, the identification image 300 can also be generated when the background region is printed using cyan (c), magenta (m), and yellow (y), and the latent image region is printed using cyan (c), magenta (m), yellow (y), and black (k).

The cause of the phenomenon in which upon generation of a copy of a printed product on which the identification image 300 is printed using a scanner and a printer, the copy having the same effect as an authentic product (the effect in which a character string or an image pattern cannot be visually observed under ordinary light but can be identified by observation through an infrared camera upon irradiation with infrared light) will be explained below.

FIG. 4A shows a process in which a copy of a printed product (the printing medium 1001 having the second region 301 and first region 302 printed on it) shown in FIG. 3C is generated using a scanner (sensor 41) and a printer 42. A portion surrounded by a broken line 401 in FIG. 4A corresponds to the region 303 shown in FIG. 3A. When the sensor 41 of the scanner reads the region 303, it obtains a pixel line 402 including pixels (pixel values) read by the respective image sensors of the sensor 41. FIG. 4A shows the pixels obtained by the sensor 41 as one block.

The pixel line 402 includes pixels having pixel values (Ra, Ga, Ba), (Rb, Gb, Bb), and (Rc, Gc, Bc). When the pixel line 402 is input to the printer 42, the printer 42 looks up a table 421 managed by itself to decide the amounts of color materials of c, m, y, and k used, that correspond to the pixel value of each pixel within the pixel line 402. The printer 42 prints each pixel using color materials in the amounts that are decided for this pixel, and then outputs a copy 403 of the printing medium 1001 having the second region 301 and first region 302 printed on it.

When attention is paid to the table 421 herein, the amounts of color materials of c, m, and y used, that correspond to the pixel values (Ra, Ga, Ba), (Rb, Gb, Bb), and (Rc, Gc, Bc), have values relatively close to each other. In contrast to this, the amount of a color material of k used, that corresponds to the pixel value (Rc, Gc, Bc), is considerably different from those of a color material of k used, that correspond to the pixel values (Ra, Ga, Ba) and (Rb, Gb, Bb). Because a color material of k has an infrared absorbance higher than that of other color materials, the fact that the amount of a color material of k used is different between the pixel values means that two regions having different infrared absorbances are formed. Therefore, when the copy 403 is observed through an infrared camera upon irradiation with infrared light, it is observed as a copy 404. That is, a relatively large difference in lightness occurs between a region in which pixels having a pixel value (Rc, Gc, Bc) are printed, and a region in which pixels having other pixel values are printed, so a character string can be identified (boundaries indicated by broken lines in FIG. 4A are shown for the sake of easy viewing, and cannot be identified in practice).

This means that two regions having different infrared absorbances are generated due to the influence of a color material having a high infrared absorbance as the sensor reads them for each small range, although they appear to be the same color to the human eye. To prevent generation of pixels that lead to different infrared absorbances on a copy as in this case, it is desired to lower the ratio of a region containing "a color material having a high infrared absorbance" to the range read by the sensor. As a method of lowering this ratio, first, it is possible to reduce the size of a region containing "a color material having a high infrared absorbance". Second, it is possible to reduce the amount of "a color material having a high infrared absorbance" used per unit area. However, if the ratio of "a color material having a high infrared absorbance" is too low, it is impossible to identify a character string on the original document upon original document authentication.

Hence, in this embodiment, an image is formed on the printing medium 1001 using a method shown in FIG. 4B. That is, in place of the first region 302 serving as a latent image region, a first latent image region 302a and a second latent image region 302b are formed on the printing medium 1001. The first latent image region 302a is formed using a color material having a high infrared absorbance in an amount larger than a threshold, and the second latent image region 302b is formed using a color material having a high infrared absorbance in an amount smaller than the threshold. This makes it possible to generate an original document which is hard to copy using a scanner and a printer, while allowing identification of a character string on the original document.

Note that the first latent image region 302a may be formed using a color material having a high infrared absorbance in an amount equal to or larger than a threshold, and the second latent image region 302b may be formed using a color material having a high infrared absorbance in an amount smaller than the threshold. Alternatively, the first latent image region 302a may be formed using a color material having a high infrared absorbance in an amount larger than a threshold, and the second latent image region 302b may be formed using a color material having a high infrared absorbance in an amount equal to or smaller than the threshold.

FIG. 4B shows a process in which a copy of the printing medium 1001 on which the identification image 300 generated by an image forming operation according to this embodiment is printed is generated using the scanner (sensor 41) and the printer 42. A portion surrounded by a broken line 405 corresponds to the region 303 shown in FIG. 3A.

The first latent image region 302a has a size smaller than that of a region read by one image sensor at once, as shown in FIG. 4B. Accordingly, an image sensor that reads the first latent image region 302a naturally reads other regions, and eventually outputs the average pixel value of the pixel values of pixels included in the first latent image region 302a and the other regions. This means that the own pixel value of the first latent image region 302a is not output. When the sensor 41 of the scanner reads the portion 405, it obtains a pixel line 406 including pixels (pixel values) read by the respective image sensors of the sensor 41. FIG. 4B shows the pixels obtained by the sensor 41 as one block as well.

The pixel line 406 includes pixels having pixel values (Ra, Ga, Ba) and (Rb, Gb, Bb). When the pixel line 406 is input to the printer 42, the printer 42 looks up the table 421 to decide the amounts of color materials of c, m, y, and k used, that correspond to the pixel value of each pixel within the pixel line 406. The printer 42 prints each pixel using color materials in the amounts that are decided for this pixel, and then outputs a copy 407 of the portion 405.

When attention is paid to the table 421, the amounts of color materials of c, m, y, and k used, that correspond to the pixel values (Ra, Ga, Ba) and (Rb, Gb, Bb), have values relatively close to each other (the amounts of a color material of k used are the same). Hence, even if the copy 407 is observed through an infrared camera upon irradiation with infrared light, it is not observed as the copy 404 but is observed as a copy 408 having no region with a relatively large difference in lightness, so a character string cannot be identified on the copy 407.

In this manner, in this embodiment, a latent image region includes the first latent image region 302a and second latent image region 302b, and the amount of a color material having a high infrared absorbance used is changed between the first latent image region 302a and the second latent image region 302b. This makes it possible to generate a printed product which is hard to copy using a scanner and a printer.

<Example of Functional Configuration of Image Processing Apparatus (Information Processing Apparatus)>

An example of the functional configuration of an image processing apparatus according to this embodiment will be described below with reference to a block diagram shown in FIG. 1A. An image processing apparatus 11 having a functional configuration in the example shown in FIG. 1A outputs, for each pixel of a print image obtained by combining a latent image on an input image, information indicating the amounts of a plurality of color materials of different colors used to print the color of this pixel on a printing medium.

An image input unit 101 acquires an input image and supplies the acquired input image to a print image data generation unit 105. A latent image generation unit 102 generates or acquires a latent image including a latent image region and a background region, and supplies the generated or acquired latent image to a configuration information generation unit 103.

The configuration information generation unit 103 generates configuration information so that a latent image region and a background region can be hardly visually observed even when a copy of a printed product is observed through an infrared camera upon irradiation with infrared light. Although this configuration information will be described in more detail later, it indicates the amount of "a color material having a high infrared absorbance" used to print each of a background region and first and second latent image regions on a print image.

A threshold holding unit 104 holds various thresholds used to form first and second latent image regions. The thresholds held in the threshold holding unit 104 will be described in more detail later.

A color information holding unit 106 holds color information C1, C2, . . . , CN indicating the amounts of N (N≥2) types of color materials used, which have different infrared absorbances, and color differences equal to or smaller than a preset threshold under visible light, for each pixel value (for example, tone levels of 0 to 255 for each of R, G, and B). In this embodiment, the color information holding unit 106 holds color information that registers the amounts of color materials of c, m, y, and k used for each pixel value. The color information holding unit 106 holds, for example, table information, as shown in FIG. 8, as color information.

The color information indicates the amounts of color materials used to represent a color represented by each pixel value (RGB value) on the printing medium. The first color C1, second color C2, and third color C3 are registered in the color information for each pixel value (RGB value), as shown in FIG. 8. The first color C1 is information indicating the amounts of color materials used to print the background region. The third color C3 is information indicating the amounts of color materials used to print the first latent image region. The second color C2 is information indicating the amounts of color materials used to print the second latent image region.

For example, if the pixel of interest in the input image has a pixel value (R2, G2, B2) and falls within the background region, the amounts of color materials used to print it (first color C1) are c=20, m=5, y=20, and k=0. If the pixel of interest in the input image falls within the first latent image region, the amounts of color materials used to print it (third color C3) are c=17, m=2, y=18, and k=5. If the pixel of interest in the input image falls within the second latent image region, the amounts of color materials used to print it (second color C2) are c=18, m=3, y=19, and k=2.

Note that the ratios of color materials to the maximum amounts given as 100 of color materials that adhere onto the printing medium per unit area for each RGB value are defined as "the amounts of color materials used". Also, as can be seen from the foregoing description, the first color C1 is used in the background region corresponding to each RGB value, the second color C2 is used in the second latent image region corresponding to each RGB value, and the third color C3 is used in the first latent image region corresponding to each RGB value.

The print image data generation unit 105 outputs the amounts of color materials of c, m, y, and k for each pixel that forms the print image, using the color information held in the color information holding unit 106, the input image acquired by the image input unit 101, and the configuration information generated by the configuration information generation unit 103.

An output unit 107 outputs, to an external printing apparatus (not shown), the amounts of color materials of c, m, y, and k used in each pixel that forms the print image. Note that when the image processing apparatus 11 is a printing apparatus including a printing mechanism such as a printer or a multifunction peripheral, the output unit 107 prints the print image on the printing medium based on the amounts of color materials of c, m, y, and k for each pixel that forms the print image.

Although color materials of c, m, y, and k are assumed to be used in printing by the printing apparatus in this embodiment, the present invention is not limited to these color materials, and various color materials (having various colors or properties) are available. In the following description, a color material having a highest infrared absorbance among a plurality of color materials of different colors will be referred to as a "highly infrared absorbent color material". In this embodiment, among a plurality of color materials of different colors: c, m, y, and k used by the printing apparatus, the color material of k has the highest infrared absorbance, and therefore serves as a highly infrared absorbent color material.

A setting unit 108 includes a button or touch panel screen that can be operated by the user, and can accept various input instructions from the user. For example, the user may set a new threshold using the setting unit 108, and register it in the threshold holding unit 104.

Figure 2A:
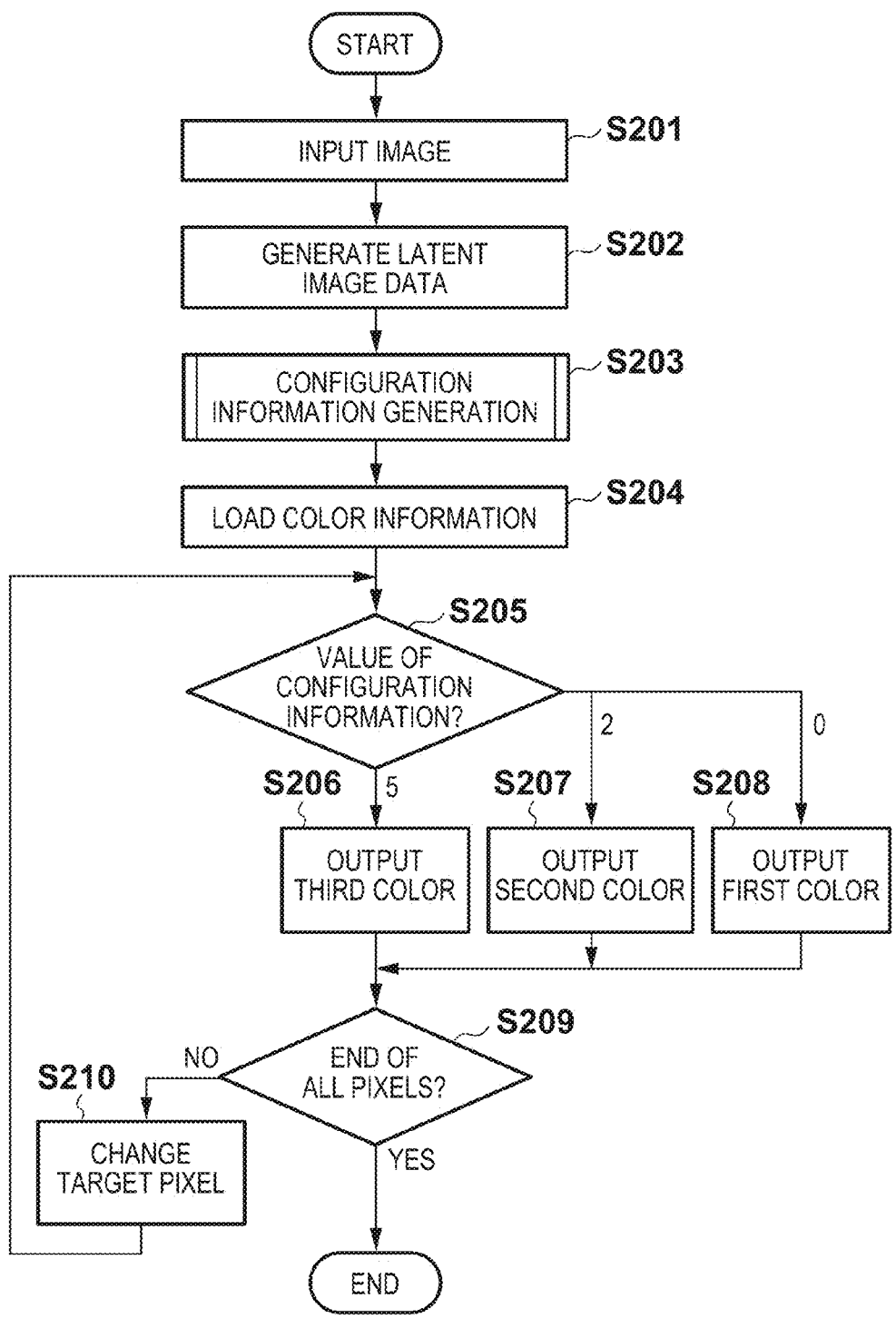
FIGS. 2A to 2C are flowcharts of processing for outputting the amounts of color materials of c, m, y, and k used.

Processing for outputting, from the image processing apparatus 11, the amounts of color materials of c, m, y, and k used in each pixel that forms the print image will be described below with reference to flowcharts shown in FIGS. 2A to 2C.

In step S201, the image input unit 101 acquires an input image I (second acquisition) and supplies it to the print image data generation unit 105. The input image I can be acquired in various modes. For example, an input image I transmitted from an external apparatus via a network may be acquired, or an input image I stored in a memory that can be accessed by the image processing apparatus 11 itself may be acquired. Alternatively, an image printed on a printing medium may be read and acquired as an input image I.

The input image I means herein an image that can be handled for each pixel. If, for example, the image input unit 101 acquires an input image I by reading a paper document, it includes a CCD (Charge-Coupled Device) or an optical sensor, and generates an input image I by performing, for example, image capture processing, electrical signal processing, and digital signal processing in accordance with an image input instruction from the setting unit 108. However, if the image input unit 101 acquires data described in a page description language, or data generated by an application which handles a unique data format, it converts it into data in a general image format (for example, a bitmap format). The converted data is used as the input image I.

Figure 9A:
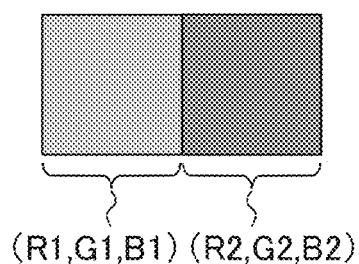
FIGS. 9A to 9E are views illustrating examples of an input image, a latent image, configuration information, and printed products under ordinary light and infrared light, respectively.

In this manner, an input image may be acquired by any method. For the sake of simplicity, the following description assumes that the input image includes a region formed by pixels having a pixel value (R1, G1, B1), and a region formed by pixels having a pixel value (R2, G2, B2), as shown in FIG. 9A. However, obviously, the following description applies not only to such a specific input image but also to an arbitrary image.

In step S202, the latent image generation unit 102 acquires, as a latent image Ic, an image of an image pattern or character string to be visualized under infrared light (first acquisition), and supplies it to the configuration information generation unit 103.

The latent image Ic means herein a binary image that can be handled for each pixel, and defines the pixel value of a pixel that forms an image pattern or character string portion (latent image region) as "1", and that of a pixel that forms a region (background region) other than the latent image region as "0". The pixel values of the pixels which form the latent image region and background region are not limited to the above-mentioned ones as long as they can be determined whether each pixel in the latent image Ic belongs to the former or latter region, as a matter of course.

Figure 9B:
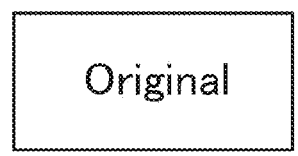

When, for example, the latent image Ic is an image as shown in FIG. 9B, a character string "Original" corresponds to the latent image region, so the pixel value of a pixel which forms the character string "Original" is "1". On the other hand, a region other than the character string corresponds to the background region, so the pixel value of a pixel which forms the region other than the character string is "0".

Note that when the latent image generation unit 102 acquires drawing information for drawing an image pattern or a character string, it may generate a binary image from the drawing information and acquire it as a latent image Ic.

Figure 5A:
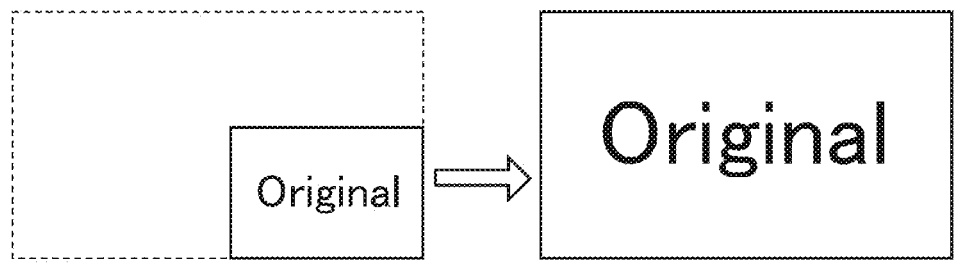
FIGS. 5A to 5C are views illustrating examples of processing of a latent image.
Figure 5B:
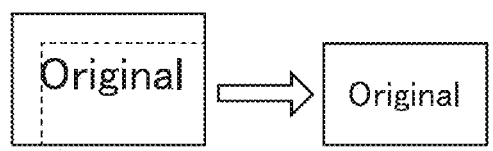
Figure 5C:
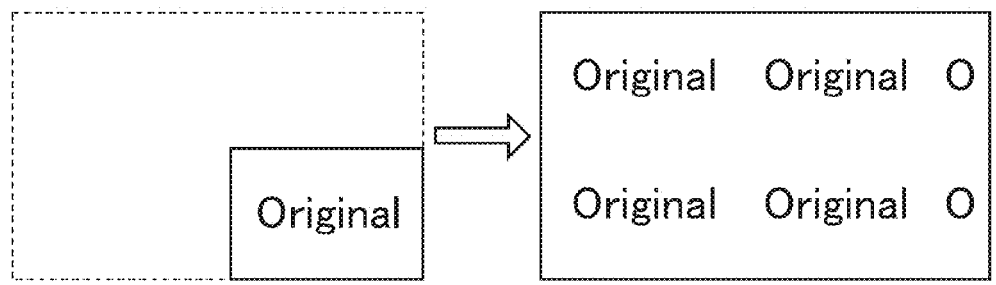

In this manner, the acquisition mode of the latent image Ic is not limited to a specific acquisition mode. Also, in this embodiment, the input image I has the same horizontal and vertical size (same size) as that of the latent image Ic. However, if, for example, the latent image Ic has a horizontal and vertical size smaller than that of the input image I, it is enlarged to have the same horizontal and vertical size as that of the input image I, as shown in, for example, FIG. 5A. If the latent image Ic has a horizontal and vertical size larger than that of the input image I, it is reduced to have the same horizontal and vertical size as that of the input image I, as shown in FIG. 5B. Also, as shown in FIG. 5C, an image obtained by repeatedly pasting latent images Ic in a region (or in a partial region) having the same horizontal and vertical size as that of the input image I may be used as a new latent image Ic. Moreover, the latent image Ic may be rotated through an appropriate angle upon a reduction or paste.

In step S203, the configuration information generation unit 103 generates configuration information Ict using the latent image Ic acquired from the latent image generation unit 102, and the thresholds held in the threshold holding unit 104 (second generation). Processing in step S203 will be described in more detail with reference to a flowchart shown in FIG. 2B.

First, in step S212, the configuration information generation unit 103 acquires a latent image Ic from the latent image generation unit 102.

In step S213, the configuration information generation unit 103 acquires thresholds from the threshold holding unit 104. The configuration information generation unit 103 uses the thresholds to generate a pixel block that has a horizontal and vertical size Rs and includes the first latent image region 302a and second latent image region 302b and, in turn, to generate formation information If from the generated pixel block, as shown in the upper view of FIG. 6A. Processing in step S213 will be described in more detail with reference to a flowchart shown in FIG. 2C.

In step S220, first, the configuration information generation unit 103 acquires thresholds Th_s and Th_c held in the threshold holding unit 104. The thresholds Th_s and Th_c will be described herein.

The threshold Th_s indicates the minimum number of pixels which can be copied by equipments (a printer and a scanner in the above-mentioned case) that copy information on a printing medium, that is, the upper limit of the size of a region which is hard to copy.

On the other hand, the threshold Th_c has a value that satisfies the following conditions. That is, a print region printed with a color material of k, and a print region printed without a color material of k are copied using a scanner and a printer. Then, the threshold Th_c has a value set in advance as the upper limit of the amount of a highly infrared absorbent color material used per unit area, at which the difference in lightness between the copied printed regions can be hardly visually observed using an infrared camera under infrared light. In other words, the threshold Th_c indicates the upper limit of the amount of a highly infrared absorbent color material, at which a printed product which is hard to copy can be generated.

When, for example, the resolution of the scanner and the output resolution of the printer are 600 [dpi], the size of a region which is hard to copy is 15 [pix] or less. Also, the applicable amount of a highly infrared absorbent color material used, in which a printed product which is hard to copy can be generated, is 3 [%] or less. Therefore, in this case, Th_s=16 and Th_c=3 are held in the threshold holding unit 104 as thresholds.

The configuration information generation unit 103 sets the horizontal and vertical size Rs of the pixel block. The horizontal and vertical size Rs may be registered in a memory in advance and read and set, or may be set using the setting unit 108. The horizontal and vertical size Rs can be arbitrarily set, but is desirably relatively small because the latent image region appears poor in quality when a large size is set. In this case, Rs=20 [pix] is set as an example.

In step S221, the configuration information generation unit 103 sets a horizontal and vertical size Rs_a of a first latent image region and a width Rs_b of a second latent image region to be laid out in the pixel block. As described above, the first latent image region is printed using a highly infrared absorbent color material in an amount larger than a threshold. Hence, to generate a printed product which is hard to copy, the horizontal and vertical size Rs_a of the first latent image region must satisfy a condition:

$$Rs\_a < Th\_s$$

In this case, Rs_a=8 [pix] is set as an example. On the other hand, the second latent image region is the remaining region other than the first latent image region in the pixel block, so the width Rs_b of the second latent image region is uniquely determined as long as the horizontal and vertical size Rs_a of the first latent image region is determined. When the first latent image region 302a and second latent image region 302b are laid out in the pixel block, as shown in the upper view of FIG. 6A, the distance between one side of the pixel block and one side of the first latent image region 302a that is nearest and parallel to the former side is Rs_b/2. Therefore, in the above-mentioned example, the width Rs_b of the second latent image region is Rs_b=Rs−Rs_a=20−8=12 [pix]. In this way, the layout of first and second latent image regions in the pixel block is determined upon processing in step S221.

In step S222, the configuration information generation unit 103 sets the amount of a highly infrared absorbent color material used in each of the first and second latent image regions. An amount Ca of a highly infrared absorbent color material used in the first latent image region, and an amount Cb of a highly infrared absorbent color material used in the second latent image region must satisfy relations:

$$Ca > Th\_c$$

$$Cb \leq Th\_c$$

In the above-mentioned example, the threshold of the amount of a highly infrared absorbent color material used, at which a printed product which is hard to copy can be generated, is Th_c=3, so Ca=5 and Cb=2 are set as an example herein. In this embodiment, Ca is set as the pixel value of the first latent image region in the pixel block, and Cb is set as the pixel value of the second latent image region in the pixel block. Hence, in this case, the pixel value (the amount of a highly infrared absorbent color material used) of the first latent image region in the pixel block is 5, and that of the second latent image region in the pixel block is 2, as shown in FIG. 6A.

In this way, a pixel block as shown in FIG. 6A is determined by determining the layout of first and second latent image regions in the pixel block, and their pixel values.

Although Cb=2 in the above-mentioned example, Cb may be any one of 0, 1, and 3 as long as Th_c=3 because Cb≤Th_c need only be satisfied. FIGS. 6B, 6C, and 6D show pixel blocks and the pixel values of the first latent image region 302a and second latent image region 302b in the pixel blocks, when Cb=0, Cb=1, and Cb=3, respectively.

In step S223, the configuration information generation unit 103 generates, as formation information (formation image) If, an image having the same horizontal and vertical size as that of the latent image Ic, from the pixel blocks generated in step S222. More specifically, the configuration information generation unit 103 arranges the pixel blocks generated in step S222 in a tile shape, as shown in FIG. 7A, to generate, as formation information If, an image having the same horizontal and vertical size as that of the latent image Ic (first generation).

Figure 2B:
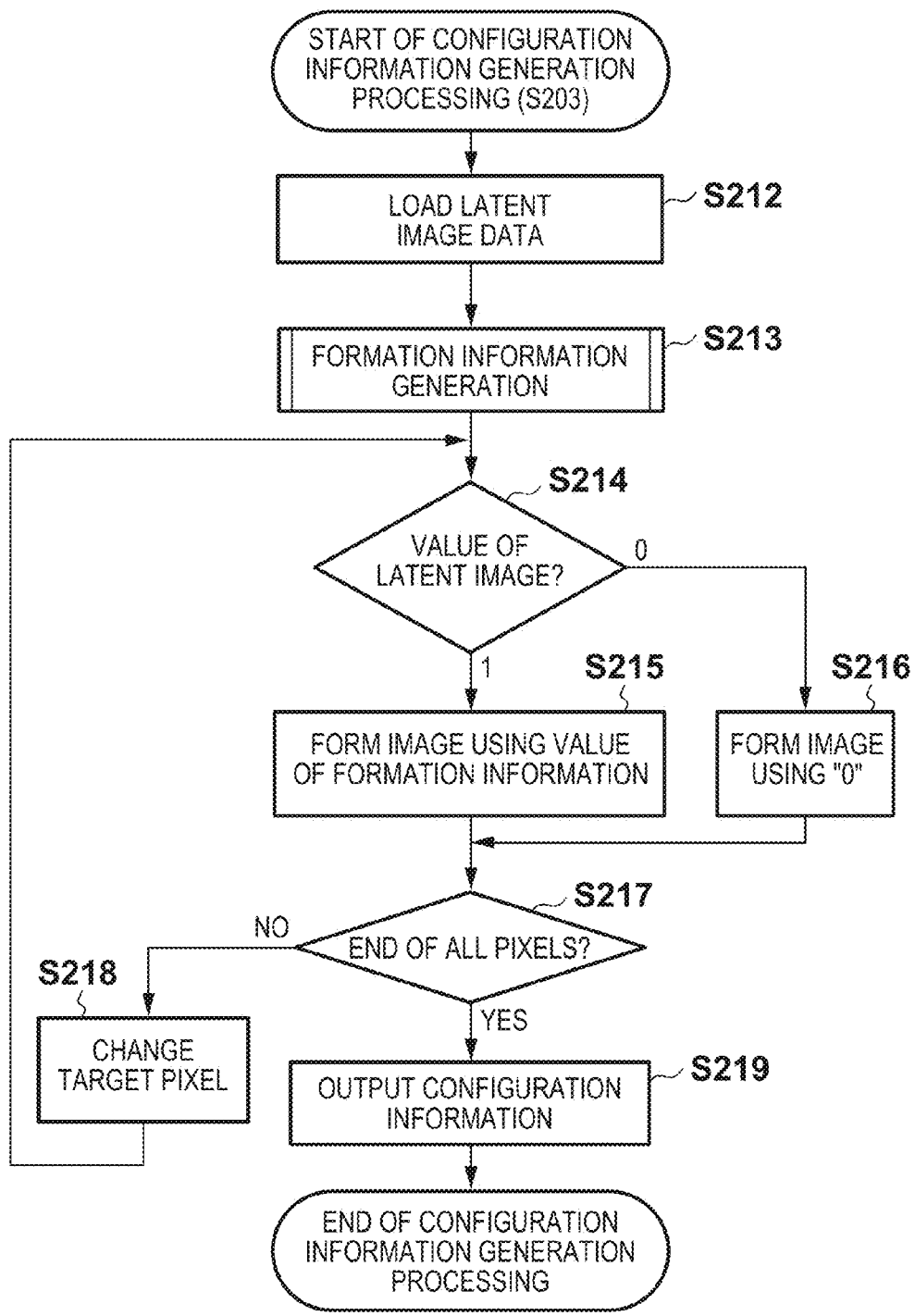
Figure 2C:
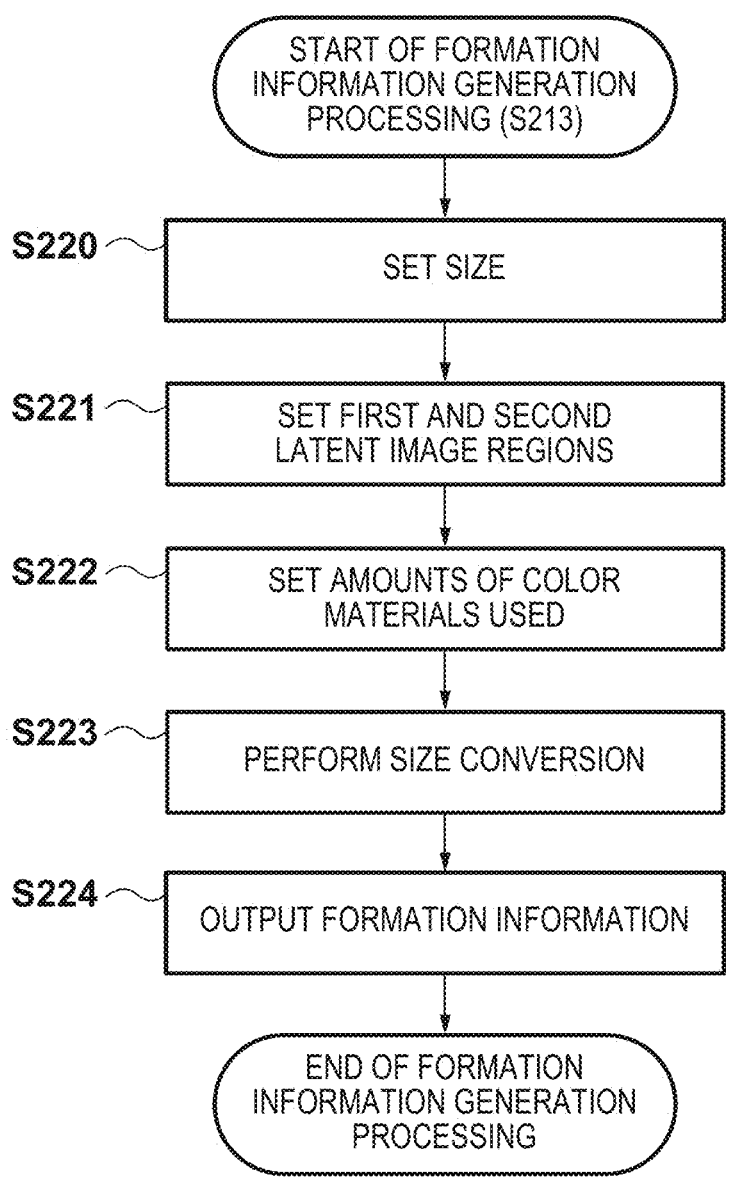

In this way, upon processing according to the flowchart shown in FIG. 2C, processing in step S213 is implemented, but the processing shown in FIG. 2C merely provides an example of the following processing for generating formation information If.

(Processing) Pixel blocks each of which has a specific size and includes pixels in a number smaller than a threshold Th_s, which have pixel values larger than a threshold Th_c determined in advance as the upper limit of the amount of a highly infrared absorbent color material used per unit area, and a plurality of pixels having pixel values smaller than the threshold Th_c are generated. An image having the same size as that of the latent image Ic is then generated as formation information If from the generated pixel blocks.

However, any processing may be adopted to generate formation information If, as long as it is equivalent to the above-mentioned (Processing) or produces a processing result equivalent to that produced by the above-mentioned (Processing).

Referring back to the flowchart shown in FIG. 2B, the configuration information generation unit 103 generates, as configuration information Ict (configuration image), an image obtained by replacing the pixel values of pixels at pixel positions belonging to the latent image region in the latent image Ic with those at the pixel positions in the formation information If.

More specifically, first, the configuration information generation unit 103 refers to the pixel value of a pixel at each pixel position in the latent image Ic. In step S214, the configuration information generation unit 103 determines whether the pixel value of the pixel at the currently referred pixel position (x, y) is "1" or "0". If it is determined in step S214 that the referred pixel value is "1" (if the referred pixel belongs to the latent image region), the processing advances to step S215. If it is determined in step S214 that the referred pixel value is "0" (if the referred pixel belongs to the background region), the processing advances to step S216.

In step S215, the configuration information generation unit 103 sets the pixel value at the pixel position (x, y) in the formation image (formation information If) as that at the pixel position (x, y) in the configuration image (configuration information Ict).

On the other hand, in step S216, the configuration information generation unit 103 sets the pixel value at the pixel position (x, y) in the latent image Ic, that is, 0 as that at the pixel position (x, y) in the configuration image (configuration information Ict).

In step S217, the configuration information generation unit 103 determines whether pixel values have been set for all pixels in the configuration information. If YES is determined in step S217, the processing advances to step S219; otherwise, the processing advances to step S218. In step S218, the configuration information generation unit 103 updates the pixel position (x, y) to that for which a pixel value is to be set, and then performs processing in step S214 and subsequent steps.

On the other hand, in step S219, the configuration information generation unit 103 sends the configuration image (configuration information) having pixel values set for all its pixels to the print image data generation unit 105. Upon processing according to the flowchart shown in FIG. 2B, configuration information Ict as shown in FIG. 7C is generated when, for example, the formation information If illustrated in FIG. 7A, and the latent image Ic (the black portion is the latent image region) illustrated in FIG. 7B are used. That is, the configuration information Ict information includes the second region 301 serving as the background region, and the first latent image region 302a and second latent image region 302b, as shown in FIG. 7C.

Figure 9C:
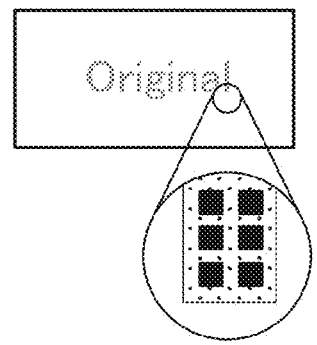

When the latent image Ic is as shown in, for example, FIG. 9B, the configuration information Ict includes a character string defined by the first latent image region 302a and second latent image region 302b, as shown in FIG. 9C.

Referring back to FIG. 2A, in step S204, the print image data generation unit 105 acquires color information, as illustrated in FIG. 8, from the color information holding unit 106. The print image data generation unit 105 refers to the pixel value of a pixel at each pixel position in the configuration information Ict. Then, the print image data generation unit 105 determines in step S205 whether the pixel value of the pixel at the currently referred pixel position (x, y) is 0, 2, or 5. That is, the print image data generation unit 105 determines in step S205 whether the pixel value of the pixel at the pixel position (x, y) indicates the background region (that is, a pixel value=0), the first latent image region (that is, a pixel value=5), or the second latent image region (that is, a pixel value=2). If it is determined in step S205 that the pixel at the pixel position (x, y) has a pixel value=0, the processing advances to step S208. If it is determined in step S205 that the pixel at the pixel position (x, y) has a pixel value=2, the processing advances to step S207. If it is determined in step S205 that the pixel at the pixel position (x, y) has a pixel value=5, the processing advances to step S206.

In step S208, the print image data generation unit 105 specifies the amounts of color materials of c, m, y, and k used, that correspond to the pixel value of the pixel at the pixel position (x, y) in the input image I, of the first colors C1 registered in the color information. The print image data generation unit 105 then outputs the specified amounts of color materials of c, m, y, and k used, as the amounts of color materials of c, m, y, and k used to print the pixel at the pixel position (x, y) in the print image. In the case of FIG. 8, the amounts of a color material of k used are 0 for all the first colors C1 registered in the color information, and therefore have the same value as the pixel value at the pixel position (x, y) in the configuration information Ict.

In step S207, the print image data generation unit 105 specifies the amounts of color materials of c, m, y, and k used, that correspond to the pixel value of the pixel at the pixel position (x, y) in the input image I, of the second colors C2 registered in the color information. The print image data generation unit 105 then outputs the specified amounts of color materials of c, m, y, and k used, as the amounts of color materials of c, m, y, and k used to print the pixel at the pixel position (x, y) in the print image. In the case of FIG. 8, the amounts of a color material of k used are 2 for all the second colors C2 registered in the color information, and therefore have the same value as the pixel value at the pixel position (x, y) in the configuration information Ict.

In step S206, the print image data generation unit 105 specifies the amounts of color materials of c, m, y, and k used, that correspond to the pixel value of the pixel at the pixel position (x, y) in the input image I, of the third colors C3 registered in the color information. The print image data generation unit 105 then outputs the specified amounts of color materials of c, m, y, and k used, as the amounts of color materials of c, m, y, and k used to print the pixel at the pixel position (x, y) in the print image. In the case of FIG. 8, the amounts of a color material of k used are 5 for all the third colors C3 registered in the color information, and therefore have the same value as the pixel value at the pixel position (x, y) in the configuration information Ict.

That is, in any of steps S206 to S208, the amounts of color materials of c, m, y, and k used in each pixel of the print image are eventually decided using the color information, and this processing also serves as the following processing, as can be understood from the foregoing description. That is, as described above, the amounts of color materials of c, m, and y used to print a pixel at the pixel position (x, y) in the print image are acquired from the color information, and the amount of a color material of k used to print this pixel is determined as the pixel value at the pixel position (x, y) in the configuration image. However, the amounts of color materials of c, m, and y used may be registered in the color information without registering the amounts of a color material of k used.

Also, when processing in any of steps S206 to S208 is performed, information which indicates the amounts of color materials of c, m, y, and k used and is output from the print image data generation unit 105 is sent from the output unit 107 to the printing apparatus. Hence, the printing apparatus prints each pixel which forms the print image, using color materials of c, m, y, and k in the amounts received from the image processing apparatus 11 for this pixel.

Figure 9D:
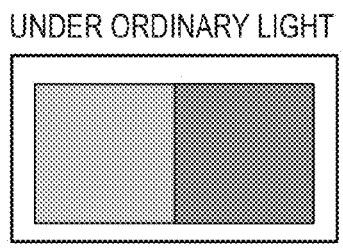
Figure 9E:
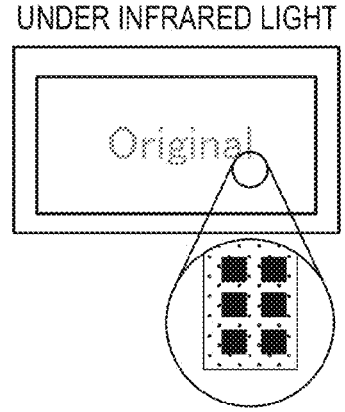

Upon the above-mentioned processing, in a printed product printed using the input image shown in FIG. 9A and the configuration information shown in FIG. 9C, the region of pixels having a pixel value (R1, G1, B1) and the region of pixels having a pixel value (R2, G2, B2) can be identified under ordinary light, as shown in FIG. 9D. When this printed product is observed using an infrared camera upon irradiation with infrared light, a latent image region can be identified, as shown in FIG. 9E. In addition, a copy having the same effect as that of this printed product can hardly be generated.

In step S209, the print image data generation unit 105 determines whether it has referred to the pixel values of pixels at all pixel positions which form the configuration information Ict. If YES is determined in step S209, the processing according to the flowchart shown in FIG. 2A ends. If NO is determined in step S209, the processing advances to step S210.

In step S210, the print image data generation unit 105 updates the pixel position (x, y) to that for which a pixel value is to be set. The print image data generation unit 105 then performs processing in step S205 and subsequent steps.

An example in which a highly infrared absorbent color material is used in the latent image region, and is not used in the background region has been given in this embodiment. However, a highly infrared absorbent color material may be used in the background region, and may not be used in the latent image region. In this case, the foregoing description need only be changed by interchanging the latent image region and background region with each other.

Also, the pixel block used in the foregoing description provides an example of a two-dimensional array as will be described below. That is, this pixel block provides an example of a two-dimensional array that has a specific size and includes array elements in a number smaller than the minimum number of pixels, which have values larger than a threshold determined in advance as the upper limit of the amount of a highly infrared absorbent color material used per unit area, and a plurality of array elements having values smaller than the threshold.

This embodiment merely provides an example of the following configuration. First, a minimum number of pixels which can be copied by equipments that copy information on a printing medium are held. When one of a latent image region and a background region is defined as a first region, and the other is defined as a second region, a latent image including the first and second regions is acquired, and an input image is acquired. A two-dimensional array that has a specific size and includes array elements in a number smaller than the minimum number of pixels, which have values larger than a threshold determined in advance as the upper limit of the amount of a highly infrared absorbent color material used per unit area, and a plurality of array elements having values smaller than the threshold is generated. A two-dimensional array having the same size as the latent image is generated from the generated two-dimensional array as a two-dimensional formation array. Also, a configuration image is generated by replacing the pixel values of pixels at pixel positions belonging to the first region in the latent image with those at the pixel positions in the two-dimensional formation array.

The amounts of a plurality of color materials of different colors used to print a pixel at each pixel position in the input image are output to the printing apparatus. At this time, the pixel value at each pixel position in the configuration image is output as the amount of a highly infrared absorbent color material used to print a pixel at this pixel position in the input image.

[Second Embodiment]

This embodiment shows a method of improving the visibility of a latent image region in authenticating a printed product. More specifically, the amount of a color material used, that has a high infrared absorbance in a second latent image region, is changed stepwise so that the contrast does not appear to suffer a rapid change at the boundary portion between first and second latent image regions. This improves the visibility of the latent image region while making it possible to generate a printed product which is hard to copy using a scanner and a printer.

Figure 10:
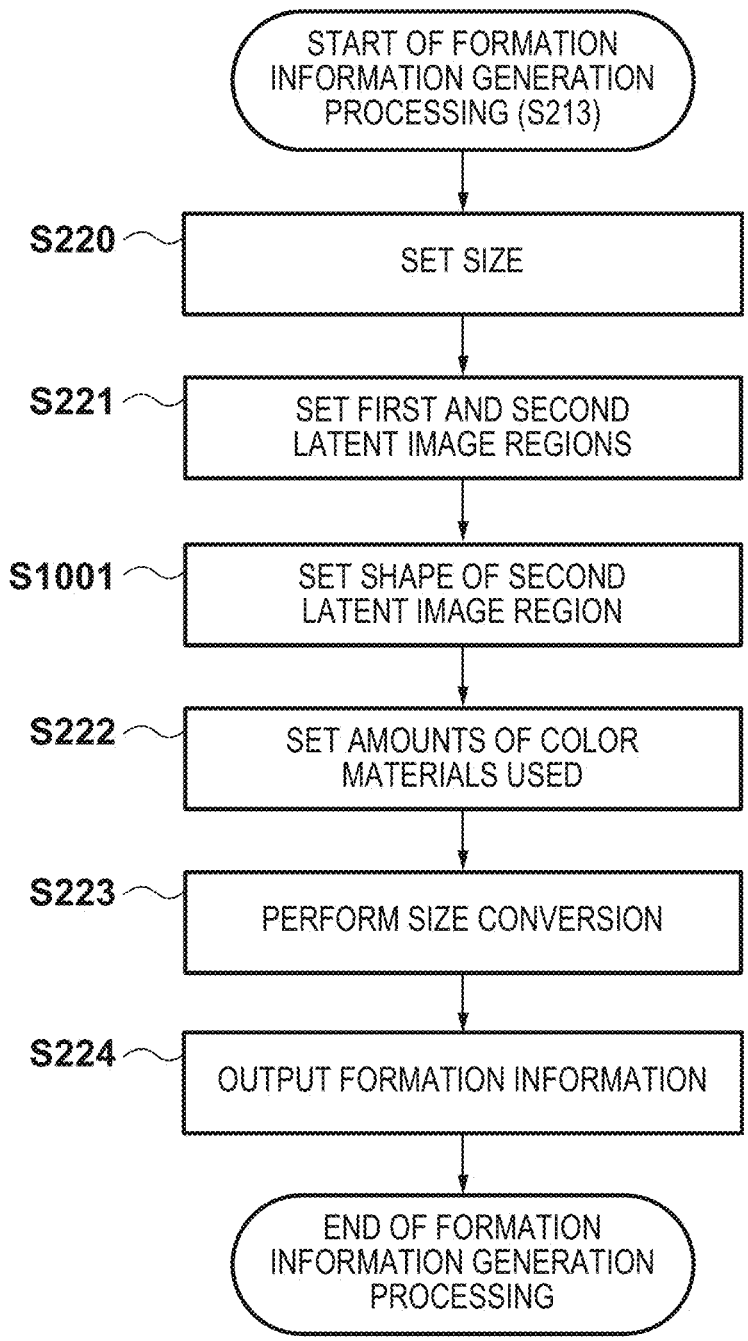
FIG. 10 is a flowchart of processing in step S213.

The difference between the first and second embodiments lies in that in the former processing according to the flowchart shown in FIG. 2C is performed in step S213, while in the latter processing according to the flowchart shown in FIG. 10 is performed in step S213. However, the second embodiment is the same as the first embodiment, except for the configuration of an image processing apparatus 11 and the processing in step S213. Also, the same step numbers as in FIG. 2C denote the same processing steps in FIG. 10, and a description thereof will not be given.

In step S1002, a configuration information generation unit 103 reconfigures a second latent image region, the layout of which is decided in step S221, using a plurality of latent image regions having different pixel values.

At this time, an amount of change Dc and a minimum amount Cbs, in which the second latent image region is changed stepwise, are set using a setting unit 108. As the amount of change Dc becomes smaller, the contrast appears to suffer less rapid change at the boundary between adjacent pixels within the region. Also, the minimum amount Cbs indicates the minimum amount of a highly infrared absorbent color material used in the second latent image region. Upon defining a threshold Th_Dc in advance, the amount of change Dc may be set equal to or smaller than the threshold Th_Dc as:

$$Dc \leq Th\_Dc$$

Figure 11:
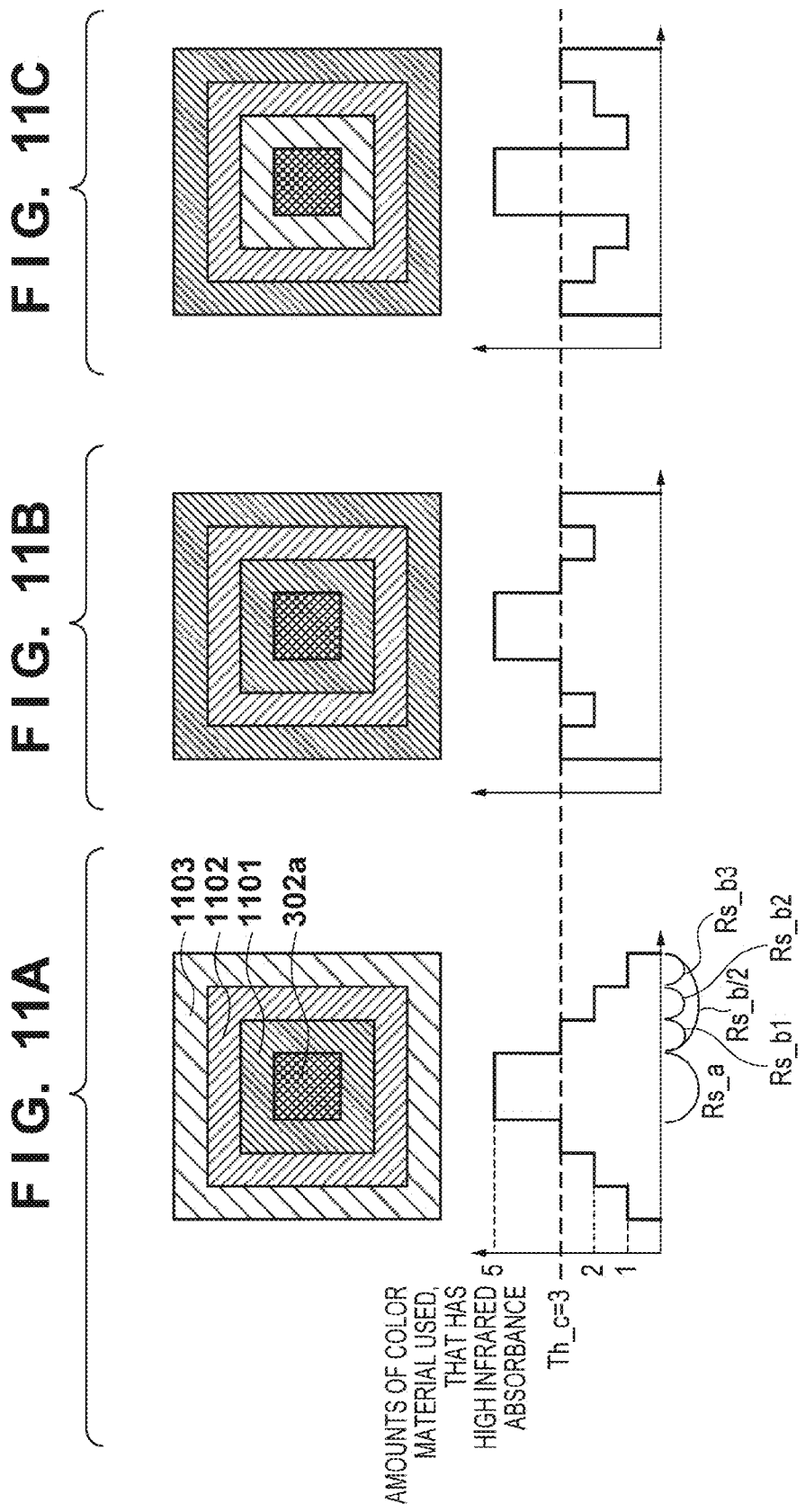
FIGS. 11A to 11C are views showing pixel blocks.

The setting unit 108 sets the type of change. The type of change means information indicating whether the second latent image region is to decrease stepwise, as shown in FIG. 11A, to decrease and then increase, as shown in FIG. 11B, or to increase, as shown in FIG. 11C. As a matter of course, the type of change is not limited to this, and various change types are available.

When, for example, Dc=1, Cbs=1, Th_c=3, and a type of change "decrease" are set, the second latent image region is reconfigured to include three regions: regions 1101, 1102, and 1103, as shown in FIG. 11A. Also, the amount of a highly infrared absorbent color material used decreases stepwise one by one as 3, 2, and 1 in these three regions. In this case, to equalize all widths Rs_b1, Rs_b2, and Rs_b3 of the regions 1101, 1102, and 1103, respectively, shown in FIG. 11A, Rs_b/2 need only be simply divided into three equal parts. Given Rs_b=12 [pix], Rs_b1=(12/2)/3=2 [pix].

Note that the widths Rs_b1, Rs_b2, and Rs_b3 may be different from each other. In this case, the setting unit 108 may individually designate the widths Rs_b1, Rs_b2, and Rs_b3.

Again, the second latent image region may be changed by any of a stepwise decrease, as shown in FIG. 11A, a decrease and then an increase, as shown in FIG. 11B, or an increase, as shown in FIG. 11C. For example, the change patterns shown in FIGS. 11A to 11C may be displayed on a screen provided on the setting unit 108 to allow the user to select and set a change pattern having a minimum rapid change in contrast.

Again, in the first embodiment, any of steps S206, S207, and S208 is executed in accordance with the currently referred pixel value because the configuration information includes three pixel values. However, as in this embodiment, when the configuration information includes four or more pixel values, the amounts of color materials of c, m, y, and k used are decided from the color information in accordance with each pixel value.

In this manner, in this embodiment, the amount of a color material used, that has a high infrared absorbance in the second latent image region, is changed stepwise, thereby not only making it possible to generate a printed product which is hard to copy but also improving the visibility of the latent image region in authenticating a printed product.

Although the amount of a highly infrared absorbent color material used in the second latent image region is changed stepwise in the second embodiment, the visibility of the latent image region improves when the second latent image region contains a highly infrared absorbent color material albeit in a small amount, as shown in, for example, FIG. 6E. Therefore, the second latent image region may be formed so that the total sum of the amounts of a highly infrared absorbent color material used in respective pixels within the second latent image region becomes equal to or larger than a predetermined threshold. For example, a sum total TCb of the amounts of a highly infrared absorbent color material used in respective pixels within the second latent image region, and a predetermined threshold Th_tcb must satisfy a condition:

$$TCb \geq Th\_tcb$$

Also, the smaller the difference between the amounts of a highly infrared absorbent color material used in the first and second latent image regions, exemplified in the first and second embodiments, the less the contrast changes, so the visibility improves.

To achieve this, a difference threshold Th_dc is set in advance and registered in a threshold holding unit 104. Amounts Ca and Cb of a highly infrared color material used in the first and second latent image regions, respectively, may be set so that a maximum value Cam of the amount Ca and a minimum value Cbm of the amount Cb satisfy a condition:

$$Cam - Cbm \leq Th\_dc$$

When, for example, Th_dc=3, amounts Ca and Cb corresponding to the maximum and minimum values Cam and Cbm that satisfy Cam−Cbm≤3 must be set. In the example illustrated in the first embodiment, Ca=5 and Cb=2, which satisfy the above-mentioned condition.

Also, although the amount of a highly infrared absorbent color material used in the background region is "0" in the first and second embodiments, the present invention is not limited to this, and a highly infrared absorbent color material may be used in the background region. However, if the background region and the latent image region have no difference in amount of a highly infrared absorbent color material used, neither the latent image region nor the background region can be identified when they are observed through an identification apparatus such as an infrared camera. It is therefore necessary to perform adjustment so that the background region and the latent image region have a given difference in amount of a highly infrared absorbent color material used.

Moreover, in the first and second embodiments, configuration information is generated, and the amounts of color materials of c, m, y, and k used in each pixel of the print image are decided from the configuration information. However, the present invention is not limited to this, and the amounts of color materials of c, m, y, and k used in each pixel of the print image may be decided directly from an input image I, a latent image Ic, and color information, instead of generating configuration information. In this case, control need only be done so that the print image is formed by a background region, a first latent image region including pixels in a number smaller than the minimum number of pixels, in which the amount of a highly infrared absorbent color material used has values larger than a threshold, and a second latent image region including pixels in which the amount of a highly infrared absorbent color material used has values equal to or smaller than the threshold.

[Third Embodiment]

In the first and second embodiments, a pixel block is generated using the same generating method, irrespective of the set mode. In contrast to this, in the third embodiment, a method of generating a pixel block is switched in accordance with the set mode.

Examples of the mode include herein a "save mode" set when a highly infrared absorbent color material is to be saved, a "text mode" set when a text is to be used as a latent image, and a "photo mode" set when a multicolored print image is to be formed. In the following description, a method of generating a pixel block is switched in accordance with various modes to generate a pixel block using the selected generating method.

An example of the functional configuration of an image processing apparatus 12 according to this embodiment will be described first with reference to a block diagram shown in FIG. 1B. The same reference numerals as in FIG. 1A denote the same constituent elements shown in FIG. 1B, and a description thereof will not be given. In the configuration shown in FIG. 1B, a mode setting unit 109 is added to the configuration shown in FIG. 1A.

In this case, the mode setting unit 109 selects the above-mentioned "save mode", "text mode", or "photo mode". This selection may be performed in accordance with a user operation via a setting unit 108, or performed by the mode setting unit 109 in accordance with the type of latent image.

The "save mode" serves to generate a pixel block for each of a background region and first and second latent image regions so as to minimize the amount of a highly infrared absorbent color material used. For example, a highly infrared absorbent color material is used in an amount smaller in the pixel block shown in FIG. 6B or 6C than in the pixel block shown in FIG. 6D. If the mode setting unit 109 selects the "save mode", the setting unit 108 instructs a configuration information generation unit 103 to generate a pixel block, as shown in, for example, FIG. 6B.

The "text mode" serves to adjust the overall size of a pixel block, and the amount of a highly infrared absorbent color material used, so as to improve the visibility of a text when it is to be used as a latent image. For example, when the font type is Ming-style type, and the font size is 10 pt, this means that the font size is relatively small, and the line width is relatively narrow, so an overall size Rs of a pixel block is set small, and a highly infrared absorbent color material is used in a large amount, thereby improving the visibility of the text.

When the mode setting unit 109 selects the "text mode", the setting unit 108 acquires a latent image Ic from a latent image generation unit 102. The mode setting unit 109 then controls a configuration information generation unit 103 to set the horizontal and vertical size Rs and the amount of a highly infrared absorbent color material used, as shown in, for example, FIG. 6D, that correspond to the font type and font size of the text in the latent image Ic.

The "photo mode" serves to use a relatively small amount of a highly infrared absorbent color material when a multicolored print image is to be formed. This is done because the use of a relatively large amount of a highly infrared absorbent color material limits the number of colors that can be used in a print image due to a considerable influence of the color of this color material. For example, when the highly infrared absorbent color material used is carbon black, the use of a relatively large amount of a highly infrared absorbent color material allows the use of only black and colors similar to black. In this mode, a relatively small amount of a highly infrared absorbent color material is used so the number of colors that can be used in a print image is not limited, thereby forming a multicolored print image.

When the mode setting unit 109 selects the "photo mode", the setting unit 108 instructs the configuration information generation unit 103 to generate a pixel block, as shown in, for example, FIG. 6C.

After a pixel block corresponding to each mode is generated in this way, the same processing as in the first embodiment is performed. In this manner, various parameters associated with a pixel block are adjusted in accordance with the set mode, thereby more reliably generating a print image in accordance with the circumstances involved. However, the settable modes are not limited to the above-mentioned modes, and various modes are available, and various types of processing corresponding to these modes are possible.

[Fourth Embodiment]

In this embodiment, the threshold Th_c is changed in accordance with the type of highly infrared absorbent color material used. This is done because the content of an absorbent component varies depending on the type of highly infrared absorbent color material, so the threshold of the amount of a highly infrared absorbent color material used, at which a printed product which is hard to copy can be generated, varies depending on the content of an absorbent component.

An example of the functional configuration of an image processing apparatus 13 which changes the threshold Th_c in accordance with the type of a highly infrared absorbent color material used will be described with reference to a block diagram shown in FIG. 1C. The same reference numerals as in FIG. 1A denote the same constituent elements shown in FIG. 1C, and a description thereof will not be given. In the configuration shown in FIG. 1C, a color material holding unit 110 is added to the configuration shown in FIG. 1A. The color material holding unit 110 registers information indicating the type of highly infrared absorbent color material used in a printing apparatus.

Also, in the first embodiment, the threshold holding unit 104 holds only one threshold Th_c, irrespective of the type of highly infrared absorbent color material. In contrast to this, in the fourth embodiment, a threshold holding unit 104 holds table information which registers thresholds Th_c corresponding to the individual types of highly infrared absorbent color materials, as shown in FIG. 13. For example, if the highly infrared absorbent color material used is color material 1, Th_c1 is registered as a threshold corresponding to color material 1. If the highly infrared absorbent color material used is color material 2, Th_c2 is registered as a threshold corresponding to color material 2.

In this case, a configuration information generation unit 103 acquires, from the color material holding unit 110, information indicating the type of highly infrared absorbent color material used in a printing apparatus, and acquires, from the table information shown in FIG. 13, the threshold Th_c corresponding to the type indicated by the acquired information. Subsequent processing is the same as in the first embodiment.

[Fifth Embodiment]

In the first and second embodiments, the first latent image region is formed by only pixels in which the amount of a highly infrared absorbent color material used is larger than a threshold, and the second latent image region is formed by only pixels in which the amount of a highly infrared absorbent color material used is equal to or smaller than the threshold.

However, the first latent image region may include pixels in which the amount of a highly infrared absorbent color material used is equal to or smaller than a threshold Th_c, as shown in, for example, FIG. 6F. Also, the second latent image region may include pixels in which the amount of a highly infrared absorbent color material used is larger than the threshold Th_c. Although the fifth embodiment is practiced for both the first and second latent image regions in FIG. 6F, it may be practiced for one of them, as a matter of course.

Eventually, the first latent image region need only include pixels, in which the amount of a highly infrared absorbent color material is larger than a threshold, at a ratio higher than a predetermined ratio. Also, the second latent image region need only include pixels, in which the amount of a highly infrared absorbent color material is equal to or smaller than the threshold, at a ratio higher than a predetermined ratio.

Let Us be the size of one side of unit area, N1 be the number of pixels in which the amount of a highly infrared absorbent color material is larger than the threshold Th_c, and N2 be the number of pixels in which the amount of a highly infrared absorbent color material is equal to or smaller than the threshold Th_c. Also, let R1 be the predetermined ratio of pixels in which the amount of a highly infrared absorbent color material is larger than a threshold in the first latent image region, and R2 be the predetermined ratio of pixels in which the amount of a highly infrared absorbent color material is equal to or smaller than the threshold in the second latent image region. At this time, formation information If is generated so as to satisfy conditions:

$$N1/(Us \times Us) > R1$$

$$N2/(Us \times Us) > R2$$

Note that subsequent processing is the same as in the first embodiment. Also, part or whole of each of the above-mentioned embodiments may be used in combination as needed, or part of each of the above-mentioned embodiments may be deleted and used solely or in combination with other embodiments.

[Sixth Embodiment]

Figure 1B:
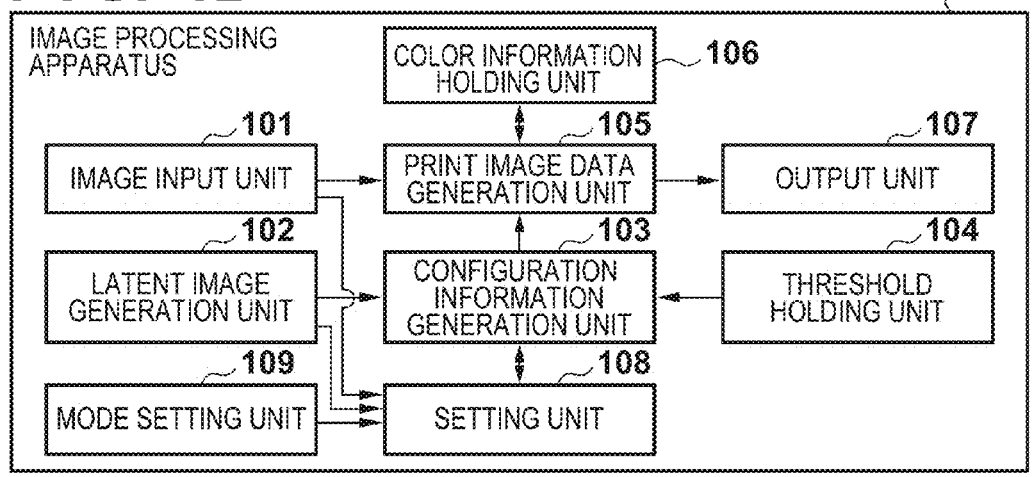
Figure 1C:
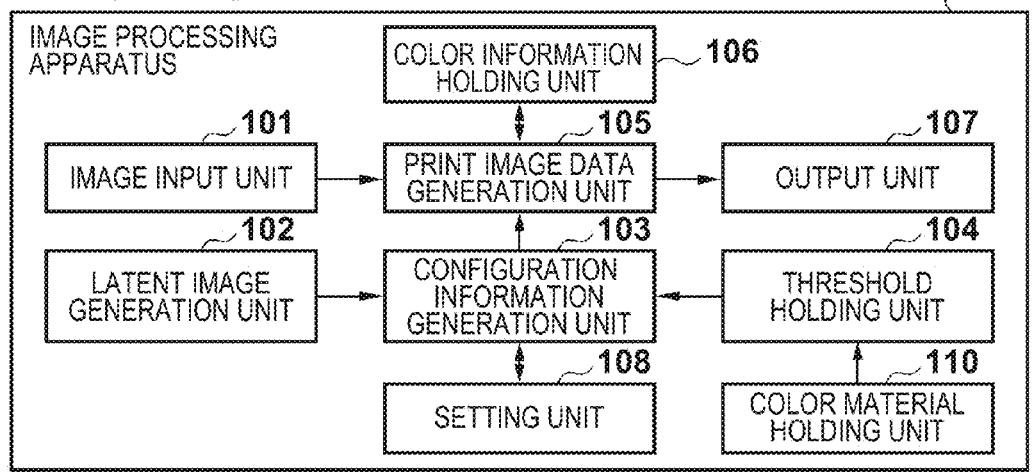

The units which constitute the image processing apparatuses 11 to 13 shown in FIGS. 1A to 1C, respectively, may be implemented as hardware. However, a color information holding unit 106, a threshold holding unit 104, and a color material holding unit 110 may be implemented using a memory, a setting unit 108 may be implemented using a button or a display screen, and the remaining units may be implemented as software. In this case, a computer 199 having a configuration as shown in FIG. 12 is applicable to a computer which includes the memory and button or display screen and executes the software.

Figure 12:
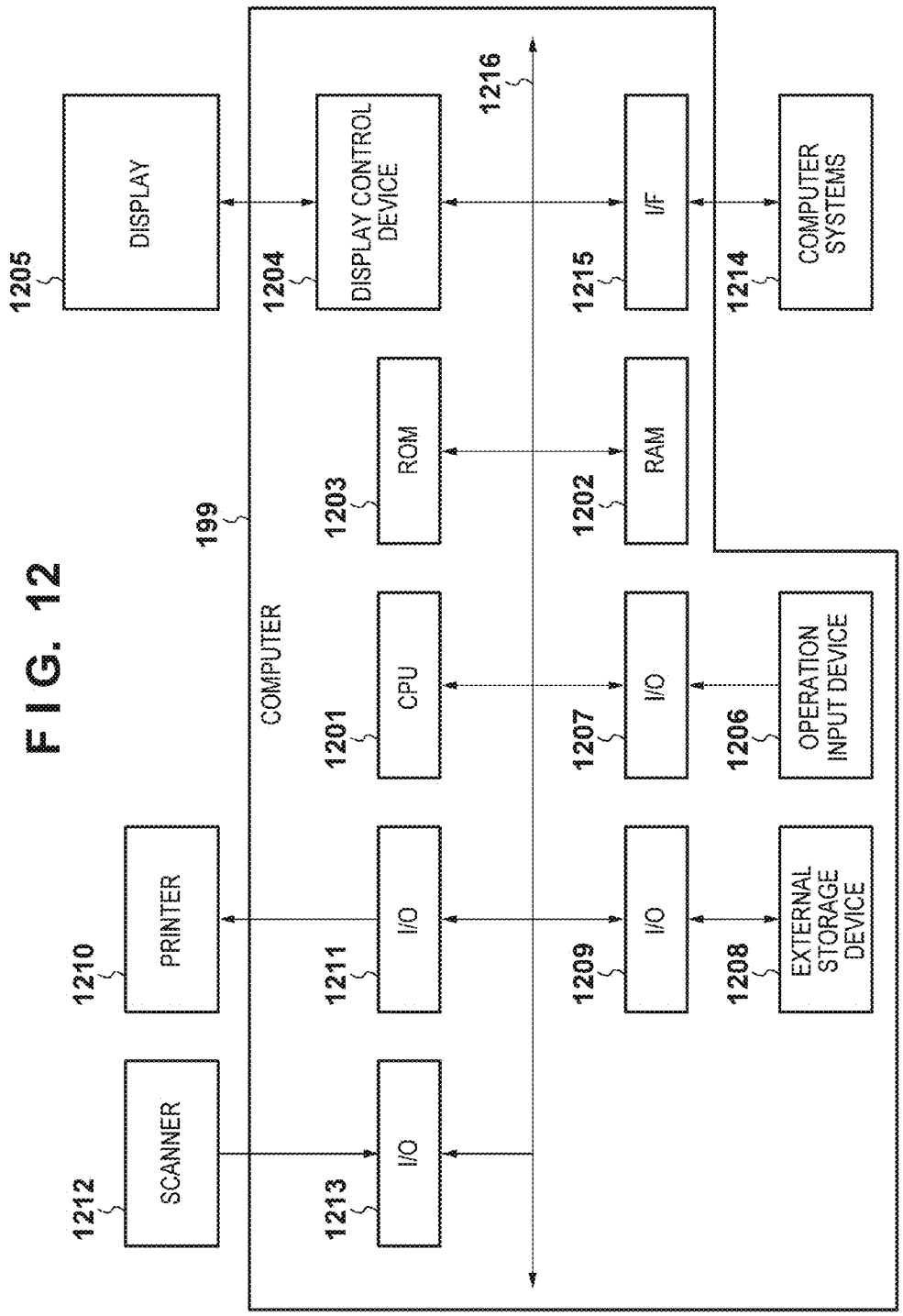
FIG. 12 is a block diagram illustrating an example of the hardware configuration of a computer applicable to the image processing apparatus.

Note that FIG. 12 shows not only an example of the hardware configuration of the computer 199, but also its peripheral equipments. However, the peripheral equipments may be included in the configuration of the computer 199 or omitted depending on the circumstances involved.

A display 1205 is implemented by, for example, a CRT or a liquid crystal screen, and can display the processing result obtained by a CPU 1201 using, for example, an image or a text. A display control device 1204 controls the operation of the display 1205.

The CPU 1201 controls the operation of the overall computer 199 using a computer program and data stored in a ROM 1203 and a RAM 1202, and executes each of the above-mentioned types of processing in the image processing apparatuses 11 to 13.

The ROM 1203 stores, for example, setting data and a boot program of the computer 199. The ROM 1203 may function as, for example, the color information holding unit 106, threshold holding unit 104, and color material holding unit 110.

The RAM 1202 has an area for temporarily storing a computer program and data loaded from an external storage device 1208, and an area for temporarily storing image data input from a scanner 1212 via an I/O 1213. The RAM 1202 also includes an area for temporarily storing various types of data received from other computer systems 1214 via an I/F (interface) 1215, and a work area used to execute various types of processing by the CPU 1201. That is, the RAM 1202 can serve as various areas as needed.

The external storage device 1208 functions as a mass information storage device, and is connected to a bus 1216 via an I/O 1209. The external storage device 1208 stores an OS (Operating System), and computer programs and data for causing the CPU 1201 to execute the function of units (other than units implemented as hardware) of an apparatus to which the computer 199 is applied. The external storage device 1208 also stores data serving as values set in advance, as described above. The computer programs and data stored in the external storage device 1208 are loaded into the RAM 1202 as needed in accordance with control by the CPU 1201, and processed by the CPU 1201. Note that the external storage device 1208 may function as, for example, the color information holding unit 106, threshold holding unit 104, and color material holding unit 110.

A printer 1210 serving as a printing apparatus is connected to an I/O 1211, and the computer 199 communicates with the printer 1210 via the I/O 1211, for example, transmits the amounts of color materials of c, m, y, and k used in each pixel of a print image to the printer 1210 via the I/O 1211. The printer 1210 is a printing apparatus such as an inkjet printer, a laser beam printer, thermal transfer printer, or a dot impact printer.

An operation input device 1206 is implemented by an input interface such as a keyboard and a mouse, and allows the user to input various instructions to the CPU 1201 upon his or her operation. The operation input device 1206 is connected to the bus 1216 via an I/O 1207.

Note that the configuration shown in FIG. 12 merely provides an example of the configuration of a computer applicable to the image processing apparatuses 11 to 13, and a new configuration may be added to the configuration shown in FIG. 12 or an unnecessary constituent element may be omitted from the configuration shown in FIG. 12. Also, part of an operation executed by one constituent element may be executed by another constituent element.

Note also that the computer may perform processing other than scanning and printing, or a dedicated hardware circuit in a scanner or printer may be used instead to perform processing to be performed by the computer.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-195346 filed Sep. 7, 2011, which is hereby incorporated by reference herein in its entirety.

What is claimed is:

1. An information processing apparatus comprising:
a unit that holds a minimum number of pixels which can be copied by an equipment that copies information on a printing medium;

a unit that acquires a latent image formed by a first region and a second region when one of a latent image region and a background region is defined as the first region, and the other is defined as the second region;

a unit that acquires an input image;

a generation unit that generates, upon defining, as a highly infrared absorbent color material, a color material having a highest infrared absorbance among a plurality of color materials of different colors used in a printing apparatus, a two-dimensional array that has a specific size and includes array elements in a number smaller than the minimum number of pixels, which have values larger than a threshold determined in advance as an upper limit of an amount of the highly infrared absorbent color material used per unit area, and a plurality of array elements having values smaller than the threshold, thereby generating, as a two-dimensional formation array, a two-dimensional array having a size identical to a size of the latent image from the generated two-dimensional array;

a unit that generates, as a configuration image, an image obtained by replacing a pixel value of a pixel at a pixel position belonging to the first region in the latent image with a value at the pixel position in the two-dimensional formation array; and an output unit that outputs, to the printing apparatus, amounts of the plurality of color materials of the different colors used to print a pixel at each pixel position in the input image, wherein said output unit outputs a pixel value at each pixel position in the configuration image, that corresponds to each pixel position in the input image, as an amount of the highly infrared absorbent color material used to print a pixel at the each pixel position in the input image.

2. The apparatus according to claim 1, wherein the threshold is set in advance, and is an upper limit of an amount of the highly infrared absorbent color material per unit area, at which, when a print region printed with the highly infrared absorbent color material and a print region printed without the highly infrared absorbent color material are copied using the equipment and observed using an infrared camera under infrared light, a difference in lightness between the copied print regions can be hardly visually observed.

3. The apparatus according to claim 1, wherein a sum total of the values of the plurality of array elements having the values smaller than the threshold is not less than a threshold determined in advance.

4. The apparatus according to claim 1, wherein the plurality of array elements having the values smaller than the threshold have identical values.

5. The apparatus according to claim 1, wherein the plurality of array elements having the values smaller than the threshold have different values.

6. The apparatus according to claim 3, wherein a difference between the values of adjacent array elements in the plurality of array elements having the values smaller than the threshold is not more than a threshold.

7. The apparatus according to claim 1, wherein a difference between a maximum value of the values of the array elements in the number smaller than the minimum number of pixels, which have the values larger than the threshold, and a minimum value of the values of the plurality of array elements having the values smaller than the threshold is not more than a threshold.

8. An information processing method executed by an information processing apparatus that holds a minimum number of pixels which can be copied by an equipment that copies information on a printing medium, the method comprising:

a step of acquiring a latent image formed by a first region and a second region when one of a latent image region and a background region is defined as the first region, and the other is defined as the second region;

a step of acquiring an input image;

a generation step of generating, upon defining, as a highly infrared absorbent color material, a color material having a highest infrared absorbance among a plurality of color materials of different colors used in a printing apparatus, a two-dimensional array that has a specific size and includes array elements in a number smaller than the minimum number of pixels, which have values larger than a threshold determined in advance as an upper limit of an amount of the highly infrared absorbent color material used per unit area, and a plurality of array elements having values smaller than the threshold, thereby generating, as a two-dimensional formation array, a two-dimensional array having a size identical to a size of the latent image from the generated two-dimensional array;

a step of generating, as a configuration image, an image obtained by replacing a pixel value of a pixel at a pixel position belonging to the first region in the latent image with a value at the pixel position in the two-dimensional formation array; and an output step of outputting, to the printing apparatus, amounts of the plurality of color materials of the different colors used to print a pixel at each pixel position in the input image, wherein in the output step, a pixel value at each pixel position in the configuration image, that corresponds to each pixel position in the input image, is output as an amount of the highly infrared absorbent color material used to print a pixel at the each pixel position in the input image.

9. A non-transitory computer-readable storage medium storing a computer program for causing a computer to function as each unit of an information processing apparatus defined in claim 1.

10. An information processing apparatus comprising:

a color information holding unit that holds color information indicating an amount of each of a plurality of color materials used, which have different infrared absorbances and color differences of those are not more than a preset threshold under visible light;

an acquisition unit that acquires latent image data indicating a non-latent image region and a latent image region;

a print image data generation unit that generates print image data from image data, the latent image data, and the color information; and a mode selection unit that selects one of a text mode in which text is used in the latent image region, and a photo mode in which a photo is used in the latent image region, wherein the print image data is formed by the non-latent image region and the latent image region, and a size of a first latent image region in the latent image region, in which an amount of a color material having a high infrared absorbance used is not less than a threshold, is smaller than a size which can be copied by an equipment that copies information on a printing medium, wherein the latent image region includes the first latent image region and a second latent image region, and an amount of the color material having the high infrared absorbance used in the second latent image region is smaller than the threshold, and wherein when the text mode is selected by said mode selection unit, the amount of the color material having the high infrared absorbance used in the second latent image region is smaller than the threshold and is larger than the amount of the color material having the high infrared absorbance in the second latent image region that is used when the photo mode is selected by said mode selection unit.

11. An information processing method comprising:

a color information holding step of holding color information indicating an amount of each of a plurality of color materials used, which have different infrared absorbances, and color differences of those are not more than a preset threshold under visible light;

an acquisition step of acquiring latent image data indicating a non-latent image region and a latent image region;

a print image data generation step of generating print image data from image data, the latent image data, and the color information; and a mode selection step of selecting one of a text mode in which a text is used in the latent image region, and a photo mode in which a photo is used in the latent image region, wherein the print image data is formed by the non-latent image region and the latent image region, and a size of a first latent image region in the latent image region, in which an amount of a color material having a high infrared absorbance used is not less than a threshold, is smaller than a size which can be copied by an equipment that copies information on a printing medium, wherein the latent image region includes the first latent image region and a second latent image region, and an amount of the color material having the high infrared absorbance used in the second latent image region is smaller than the threshold, and wherein when the text mode is selected in the mode selection step, the amount of the color material having the high infrared absorbance used in the second latent image region is smaller than the threshold and is larger than the amount of the color material having the high infrared absorbance in the second latent image region that is used when the photo mode is selected in the mode selection step.

12. A non-transitory computer-readable storage medium storing a computer program for causing a computer to function as each unit of an information processing apparatus defined in claim 10.

* * * * *